(12) United States Patent
Kim et al.

(10) Patent No.: US 12,028,634 B2
(45) Date of Patent: Jul. 2, 2024

(54) IMAGE SENSOR

(71) Applicant: SAMSUNG ELECTRONICS CO., LTD., Suwon-si (KR)

(72) Inventors: Kyungmin Kim, Seoul (KR); Hoyong Na, Daegu (KR); Jihun Shin, Seongnam-si (KR); Youngtae Jang, Pyeongtaek-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 213 days.

(21) Appl. No.: 17/570,746

(22) Filed: Jan. 7, 2022

(65) Prior Publication Data
US 2022/0377268 A1 Nov. 24, 2022

(30) Foreign Application Priority Data
May 18, 2021 (KR) .......................... 10-2021-0064146

(51) Int. Cl.
*H04N 25/75* (2023.01)
*H04N 25/46* (2023.01)
*H04N 25/705* (2023.01)

(52) U.S. Cl.
CPC ............. *H04N 25/75* (2023.01); *H04N 25/46* (2023.01); *H04N 25/705* (2023.01)

(58) Field of Classification Search
CPC ...... H04N 25/75; H04N 25/46; H04N 25/705; H04N 25/79; H04N 25/74; H04N 25/709; H01L 27/14603; H01L 27/14609; H01L 27/14636
See application file for complete search history.

(56) References Cited

U.S. PATENT DOCUMENTS

| 7,652,703 | B2 | 1/2010 | Panicacci |
| 7,880,786 | B2 | 2/2011 | Muramatsu |
| 8,717,471 | B2 | 5/2014 | Sato |
| 10,319,774 | B2 | 6/2019 | Arita |
| 2011/0128426 | A1 | 6/2011 | Taruki et al. |
| 2013/0087683 | A1 | 4/2013 | Mo et al. |
| 2018/0109750 | A1* | 4/2018 | Sukegawa ............... H04N 23/65 |

FOREIGN PATENT DOCUMENTS

KR    1020150020424 A    2/2015

* cited by examiner

*Primary Examiner* — Michael E Teitelbaum
(74) *Attorney, Agent, or Firm* — Sughrue Mion, PLLC

(57) ABSTRACT

An image sensor includes a first layer including a pixel array region having a plurality of pixels arranged in a plurality of row lines and a plurality of column lines; and a second layer including a row driver selecting at least a portion of the plurality of row lines, generating pixel control signals driving selected row lines, and outputting the pixel control signals to control signal lines, wherein the selected row lines share the control signal lines, at a branch point of the first layer, the selected row lines receive the pixel control signals from the control signal lines in common, and the pixel control signals simultaneously drive the selected row lines.

14 Claims, 29 Drawing Sheets

IMAGE SENSOR

CROSS-REFERENCE TO RELATED APPLICATION(S)

This application is based on and claims priority from Korean Patent Application No. 10-2021-0064146 filed on May 18, 2021 in the Korean Intellectual Property Office, the disclosure of which is incorporated herein by reference in its entirety.

BACKGROUND

The inventive concept of the disclosure relates to an image sensor.

An image sensor may be a semiconductor-based sensor receiving light and generating an electrical signal, and may include a pixel array having a plurality of pixels, a logic circuit driving the pixel array and generating an image, and the like. In a method of simultaneously driving a plurality of row lines to simultaneously read pixel signals output from pixels connected to the row lines, a data throughput may increase and need for power supply may increase. However, as the readout circuit is disposed to surround at least a portion of the logic circuit, power supply to the logic circuit may not be smoothly carried out.

SUMMARY

An aspect of the inventive concept is to provide an image sensor in which a row driver circuit controls a plurality of rows.

According to an aspect of the disclosure, there is provided an image sensor including: a first layer including a pixel array region having a plurality of pixels arranged in a plurality of row lines and a plurality of column lines; and a second layer including a row driver, the row driver configured to select at least a portion of the plurality of row lines as selected row lines, generate pixel control signals driving the selected row lines, and output the pixel control signals to control signal lines, wherein the selected row lines share the control signal lines, the selected row lines commonly receive the pixel control signals at a branch point of the first layer from the control signal lines, and the pixel control signals simultaneously drive the selected row lines.

According to another aspect of the disclosure, there is provided an image sensor including: a first layer including a pixel array region having a plurality of pixels arranged in a plurality of row lines and a plurality of column lines; and a second layer including a row driver, the row driver configured to select at least a portion of the plurality of row lines as selected row lines, generate pixel control signals driving the selected row lines, and supply the pixel control signals to the selected row lines through control signal lines, wherein the row driver includes a plurality of row driver circuits, first row lines, among the plurality of row lines, selected during a first horizontal cycle receive first pixel control signals from a common row driver circuit, each of second row lines, among the plurality of row lines, selected during a second horizontal cycle, after the first horizontal cycle, receive second pixel control signals from individual row driver circuits.

According to another aspect of the disclosure, there is provided an image sensor including: a first layer including a pixel array region having a plurality of pixels arranged in a plurality of row lines and a plurality of column lines; and a second layer including a row driver, the row driver configured to select at least a portion of the plurality of row lines as selected row lines, generate pixel control signals driving the selected row lines, and supply the pixel control signals to the selected row lines through control signal lines, wherein the second layer includes a logic circuit including a plurality of transistors, wherein a power line supplying power to the logic circuit is separated from the row driver in a direction, parallel to a plane of the second layer.

According to another aspect of the disclosure, there is provided an image sensor including: a first layer including a pixel array region having a plurality of pixels arranged in matrix form having a plurality of rows and a plurality of columns; and a second layer including a row driver, the row driver configured to select at least two rows, among the plurality of rows as selected rows, generate pixel control signals driving the selected at least two rows, and output the pixel control signals to control signal lines, wherein the selected at least two rows share the control signal lines, and commonly receive the pixel control signals from the control signal lines to simultaneously drive the selected at least two rows.

BRIEF DESCRIPTION OF DRAWINGS

The above and other aspects, features, and advantages of the inventive concept will be more clearly understood from the following detailed description, taken in conjunction with the accompanying drawings, in which.

DETAILED DESCRIPTION

Hereinafter, preferred embodiments of the inventive concept will be described with reference to the accompanying drawings.

Figure 1:
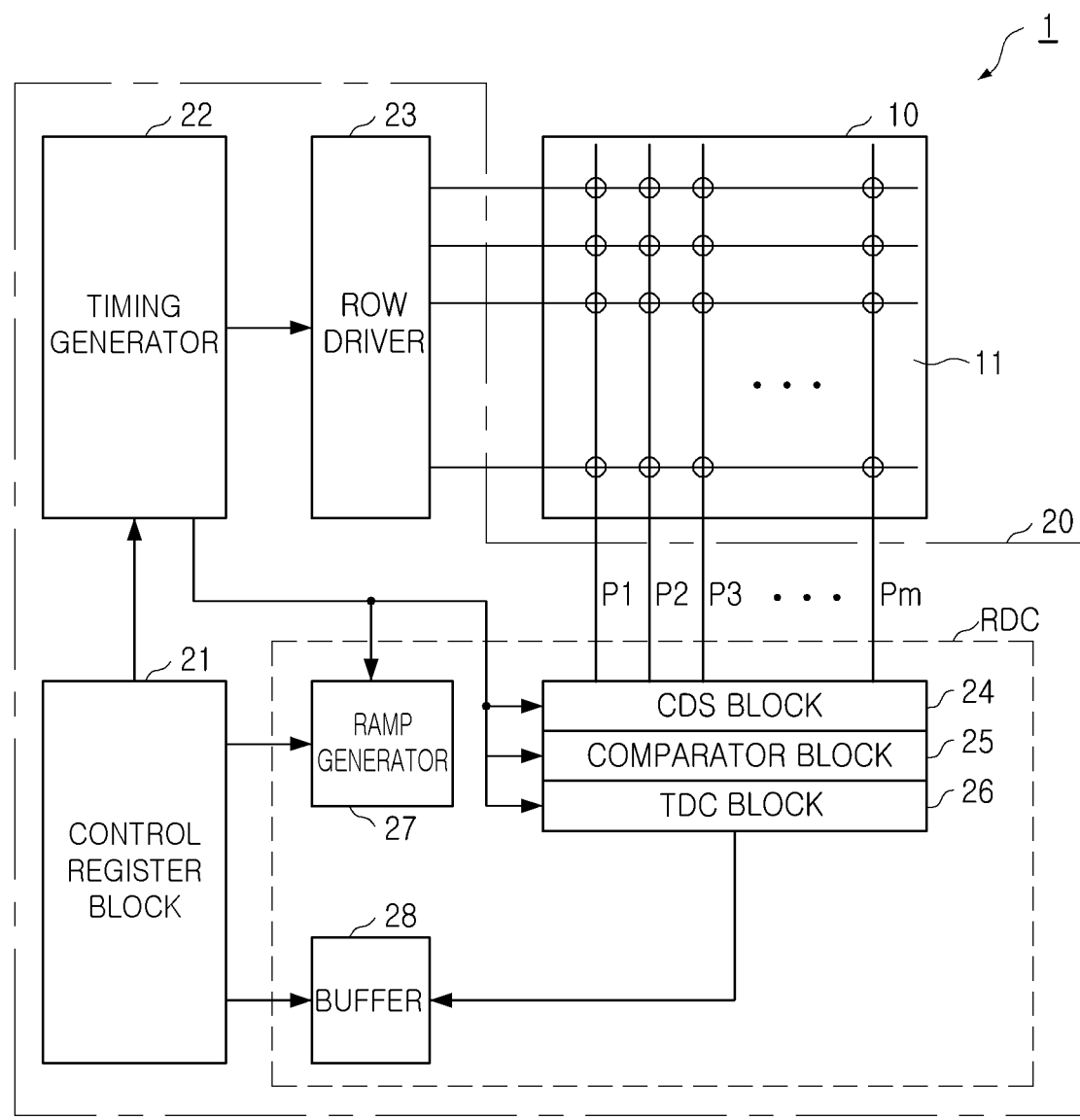
FIG. 1 is a block diagram illustrating a memory system according to an example embodiment of the inventive concept.

FIG. 1 is a block diagram illustrating a memory system according to an example embodiment of the inventive concept.

Referring to FIG. 1, an image sensor 1 may include a pixel array 10 and a peripheral circuit 20. The peripheral circuit 20 may include a control register block 21, a timing generator 22, a row driver 23, a correlated double sampling (CDS) block 24, a comparator block 25, a time-to-digital converting (TDC) block 26, a ramp signal generator 27, and a buffer 28. In this case, the correlated double sampling block 24, the comparator block 25, and the TDC block 26 may constitute an analog-digital converter (ADC), and the ADC, the ramp signal generator 27, and the buffer 28 may constitute a readout circuit (RDC).

The pixel array 10 may include a plurality of pixels 11 arranged in matrix form. The plurality of pixels 11 may be arranged in a plurality of row lines and a plurality of column lines. Each of the plurality of pixels 11 may include at least one photoelectric conversion element generating a charge in response to light, and a pixel circuit generating a pixel signal corresponding to the charge generated by the photoelectric conversion element. The photoelectric conversion device may include a photodiode formed of a semiconductor material, and/or an organic photodiode formed of an organic material, or the like.

For example, the pixel circuit may include a floating diffusion, a transfer transistor, a reset transistor, a driving transistor, a select transistor, or the like. Configurations of the pixels 11 may vary according to various example embodiments. For example, according to an example embodiment, each of the pixels 11 may include an organic photodiode including an organic material, or may be implemented as a digital pixel. When the pixels 11 are implemented as digital pixels, each of the pixels 11 may include an analog-to-digital converter for outputting a digital pixel signal.

The timing generator 22 may generate control signals for controlling operation timing of the image sensor 1. Specifically, the timing generator 22 may control an operation of the row driver 23, an operation of the correlated double sampling block 24, an operation of the comparator block 25, an operation of the TDC block 26, and an operation of the ramp signal generator 27, under control of the control register block 21.

The row driver 23 may select at least a portion of the plurality of row lines of the pixel array 10 under control of the timing generator 22, and may generate pixel control signals for driving selected row lines. The row driver 23 may provide the pixel control signals to the plurality of row lines of the pixel array 10 through control signal lines. In this case, the pixel control signals may refer to signals for controlling a plurality of transistors included in a unit pixel.

The correlated double sampling block 24 may receive pixel signals P1 to Pm (where m is a natural number) from the plurality of column lines implemented in the pixel array 10, and may perform a correlated double sampling operation for each of the received pixel signals P1 to Pm. Specifically, the correlated double sampling block 24 may double-sample a specific noise level and a signal level corresponding to a pixel signal, and may output a difference level corresponding to a difference between the noise level and the signal level.

The comparator block 25 may compare each of the correlated double sampled pixel signals output from the correlated double sampling block 24 with a ramp signal output from the ramp signal generator 27, and may output comparison signals based on a result of the comparison between the correlated double sampled pixel signals and the ramp signal.

The TDC block 26 may count the comparison signals according to the clock signal, may convert each of the comparison signals output from the comparator block 25 into a plurality of pieces of digital data, and may output the plurality of pieces of digital data to the buffer 28.

The ramp signal generator 27 may generate a ramp signal under control of the timing generator 22. The ramp signal generator 27 may use a current-type digital-to-analog converter (DAC) or a voltage-current converter (VI converter), to change a voltage level of the ramp signal while changing current flowing over time. The ramp signal may be generated as a voltage having a single slope, and may be provided to the comparator block 25, to be compared with a pixel signal output from the pixel array 10.

The control register block 21 may control an operation of the timing generator 22, an operation of the ramp signal generator 27, and an operation of the buffer 28, under control of a digital signal processor.

The buffer 28 may store the pieces of digital data, output from the analog-to-digital conversion block 26, in frame units. Therefore, the buffer 28 may be referred to as a frame memory or a buffer memory. The buffer 28 may output the pieces of digital data stored in frame units to the digital signal processor.

According to an example embodiment, the image sensor 1 may further include an image signal processor (ISP). The image signal processor may perform signal processing on the raw data stored in the buffer 28, to output image data. According to an example embodiment, the image signal processor may be implemented in the digital signal processor.

For example, the image signal processor may include a plurality of logic blocks for performing signal processing operations such as color interpolation, color correction, auto white balance, gamma correction, color saturation correction, format correction, bad pixel correction, hue correction, auto expose, auto focus, phase defector auto focus (PDAF), and the like, for the raw data.

According to an example embodiment, the image sensor 1 may further include a voltage doubler increasing a voltage using a charge pump. According to an example embodiment, the image sensor 1 may further include a reference voltage generation block and a reference current generation block. The reference voltage generation block and the reference current generation block may refer to bias blocks. In some example embodiments, the image sensor 1 may further include a communication block (e.g., a Mipi block).

The row driver 23 may include a plurality of row driver circuits. In general, a row driver circuit may be provided to control a row. In a multi-row simultaneous readout method of simultaneously driving a plurality of rows to process pixel signals, pixel control signals having the same timing sequence may be input to rows to be simultaneously driven.

According to an example embodiment, when pixels included in the rows to be simultaneously driven operate independently of each other, a row driver circuit may control a plurality of rows. To achieve this, row lines included in the plurality of rows may share control signal lines connected to the row driver circuit, and may receive pixel control signals in common from the control signal lines.

Therefore, the number of row driver circuits included in the row driver 23 may be reduced, and accordingly, a size of the row driver 23 may be reduced. When the size of the row driver 23 is reduced, a width of a power line supplying power from a logic power pad to a logic circuit may increase, and the number of stacked layers that may be used as the power line may increase. Therefore, sufficient power may be supplied to the logic circuit.

Also, the number of control signal lines connected from the row driver 23 to the pixel array 10 may be reduced. Therefore, routing of the control signal lines input to the pixel array 10 may be easy.

Figure 2:
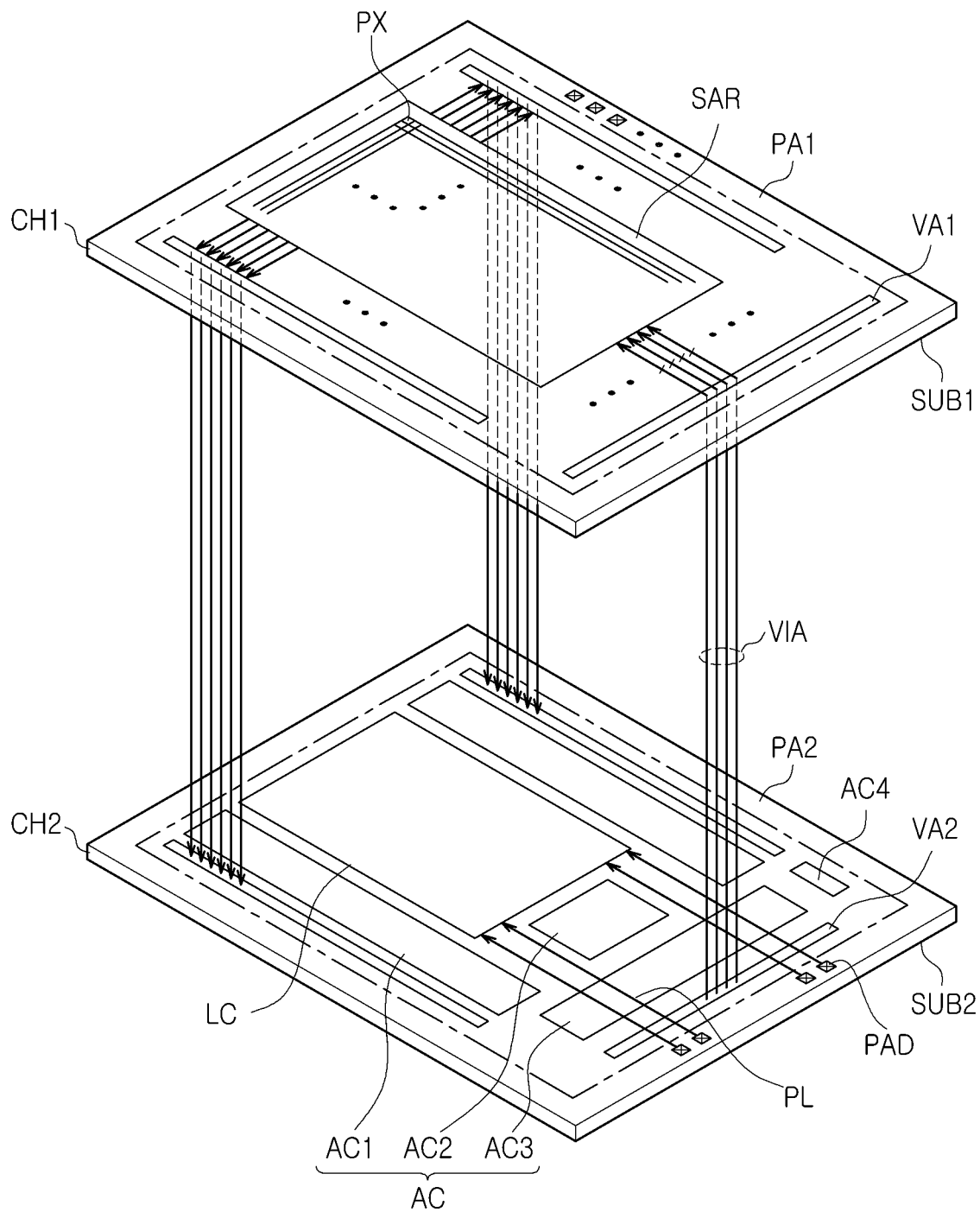
FIG. 2 is a comparative example of a perspective view illustrating an image sensor.

FIG. 2 is a comparative example of a perspective view illustrating an image sensor.

Referring to FIG. 2, an image sensor 100 may include a first layer CH1 and a second layer CH2. The first layer CH1 and the second layer CH2 may be stacked and bonded in a direction, perpendicular to each other, to form a stacked wafer structure.

The first layer CH1 may include a pixel array region SAR, a first pad region PA1, and a first via region VA1, formed on a first semiconductor substrate SUB1. The pixel array region SAR may include a pixel array including a plurality of pixels PX arranged in a plurality of row lines and a plurality of column lines.

The second layer CH2 may include a plurality of elements that provide a logic circuit LC in a second semiconductor substrate SUB2. The plurality of elements included in the logic circuit LC may refer to electronic elements including a plurality of transistors, and may provide a control register block, a timing generator, a communication block, an image signal processor, or the like.

The second layer CH2 may include a plurality of elements that provide analog circuits AC in the second semiconductor substrate SUB2. The analog circuits AC may include an ADC AC1, a ramp signal generator and bias block AC2, a row driver AC3, and a voltage doubler AC4.

The second layer CH2 may include a second via region VA2. Vias VIA for exchanging electrical signals between the first layer CH1 and the second layer CH2 may be formed in the first via region VA1 and the second via region VA2. For example, the vias VIA may be back via stacks (BVS), but are not limited thereto. The vias VIA may form a portion of control signal lines.

For example, when four rows are driven simultaneously, four row driver circuits included in the row driver AC3 may generate pixel control signals for driving the four rows corresponding thereto, respectively. The control signal lines may transfer the pixel control signals from the four row driver circuits to row lines included in the four rows.

The second pad region PA2 of the second layer CH2 may include a plurality of pads PAD used to transmit and receive electrical signals to and from the outside.

The plurality of pads PAD may include a logic pad PAD, respectively. The logic pad PAD may include a logic signal pad PAD and a logic power pad PAD. The logic circuit LC may exchange data externally through the logic signal pad PAD, and may receive power externally through the logic power pad PAD.

In a multi-row simultaneous readout method of simultaneously driving a plurality of rows to process pixel signals, a data throughput may increase and need for power supply may increase. Since analog circuits AC may be disposed on three of four surfaces of a chip (e.g., CH2), it may be difficult to supply sufficient power to a logic circuit (LC).

In the image sensor illustrated in FIG. 2, a power line PL for supplying power from the logic power pad PAD to the logic circuit LC may overlap the row driver AC3 in a direction, parallel to a plane of the second layer CH2. In this case, the power line PL may be disposed between the vias VIA. Therefore, use of the power line PL for supplying power may be limited due to noise coupling. For example, only a portion of a plurality of stacked layers may be used as the power line PL. For example, it may be difficult to supply sufficient power to the logic circuit LC.

According to an example embodiment of the inventive concept, in the image sensor 100, a row driver circuit may control a plurality of rows. Therefore, since the number of row driver circuits included in the row driver AC3 may be reduced, a size of the row driver AC3 may be reduced and the number of vias VIA may also be reduced. Therefore, a width of the power line PL for supplying power from the logic power pad PAD to the logic circuit LC may increase, and the number of stacked layers that may be used as the power line PL may increase. Therefore, sufficient power may be supplied to the logic circuit LC.

In addition, a space occupied by the row driver AC3 may be used as a region of the logic circuit LC.

Figure 3:
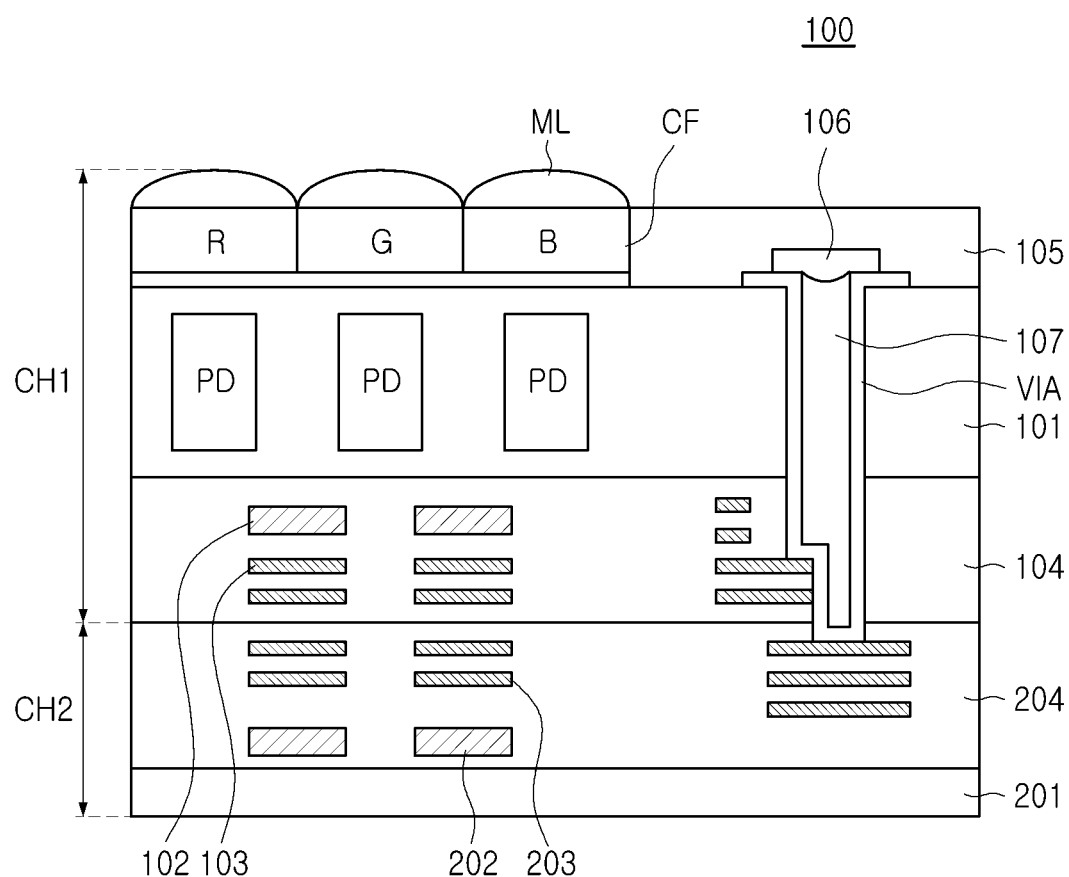
FIG. 3 is a cross-sectional view of an image sensor according to an example embodiment of the inventive concept.

FIG. 3 is a cross-sectional view of an image sensor according to an example embodiment of the inventive concept.

Referring to FIG. 3, an image sensor 100 may include a first layer CH1 and a second layer CH2.

The first layer CH1 may include a first semiconductor substrate 101, the photoelectric conversion elements PD formed in the first semiconductor substrate 101, color filters CF, microlenses ML on the color filters CF, first gate electrodes 102, first metal wirings 103, a first insulating layer 104, a capping layer 105, and a via VIA.

The second layer CH2 may include a second semiconductor substrate 201, a second insulating layer 204 formed on the second semiconductor substrate 201, second gate electrodes 202, and second metal wirings 203.

The via VIA may sequentially pass through the first semiconductor substrate 101 and the first insulating layer 104, and may extend into the second insulating layer 204. The via VIA may be a conductive layer electrically connecting the first metal wirings 103 and the second metal wirings 203. The first layer CH1 may further include a gap-fill insulating layer 107 filling a via hole in the conductive layer, and a buffer insulating layer 106 covering the gap-fill insulating layer 107.

Figure 4:
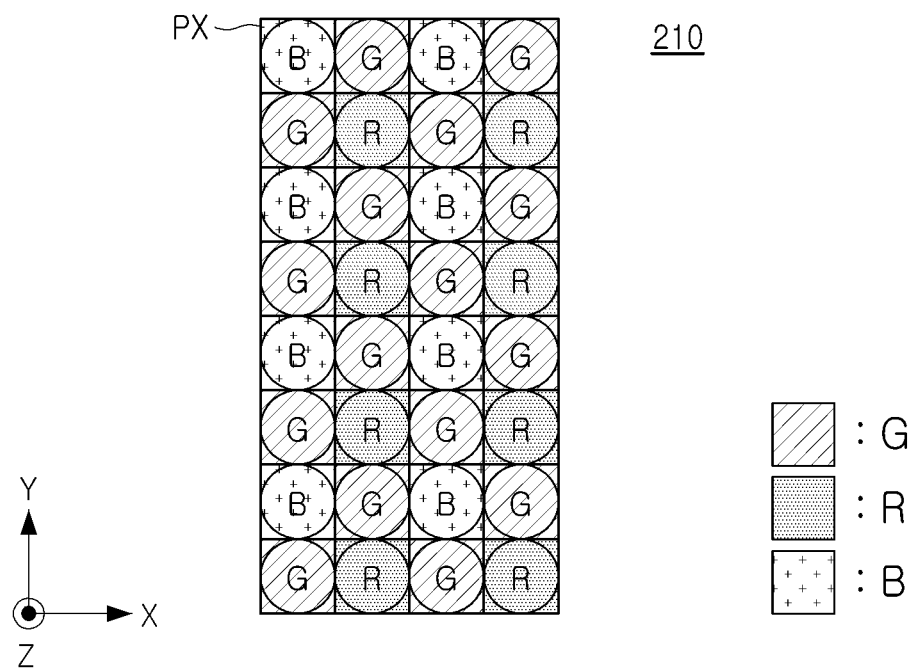
FIG. 4 is a diagram schematically illustrating a pixel array of an image sensor according to an example embodiment of the inventive concept.
Figure 5A:
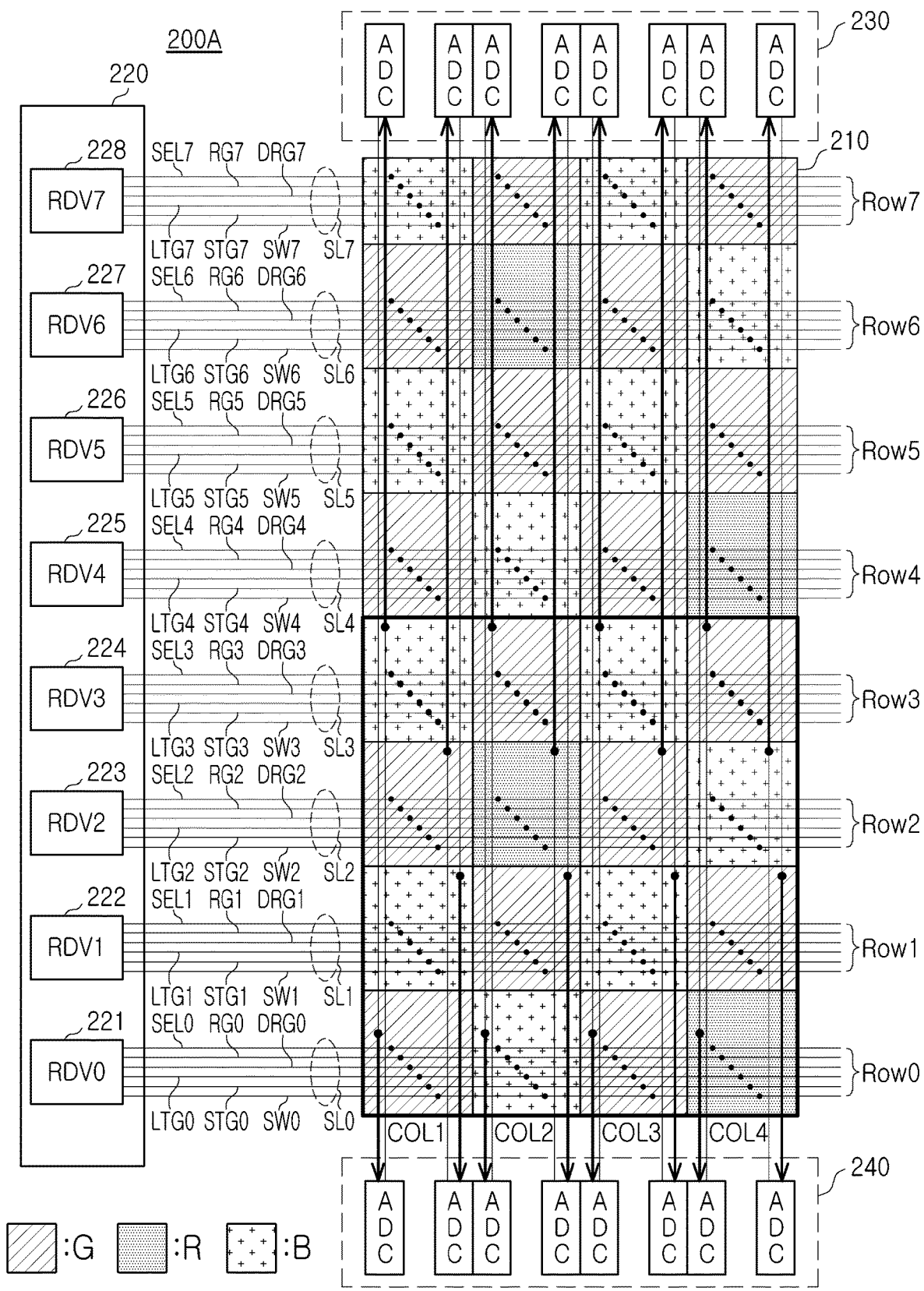
FIGS. 5A and 5B are conceptual diagrams illustrating a readout method of an image sensor.
Figure 5B:
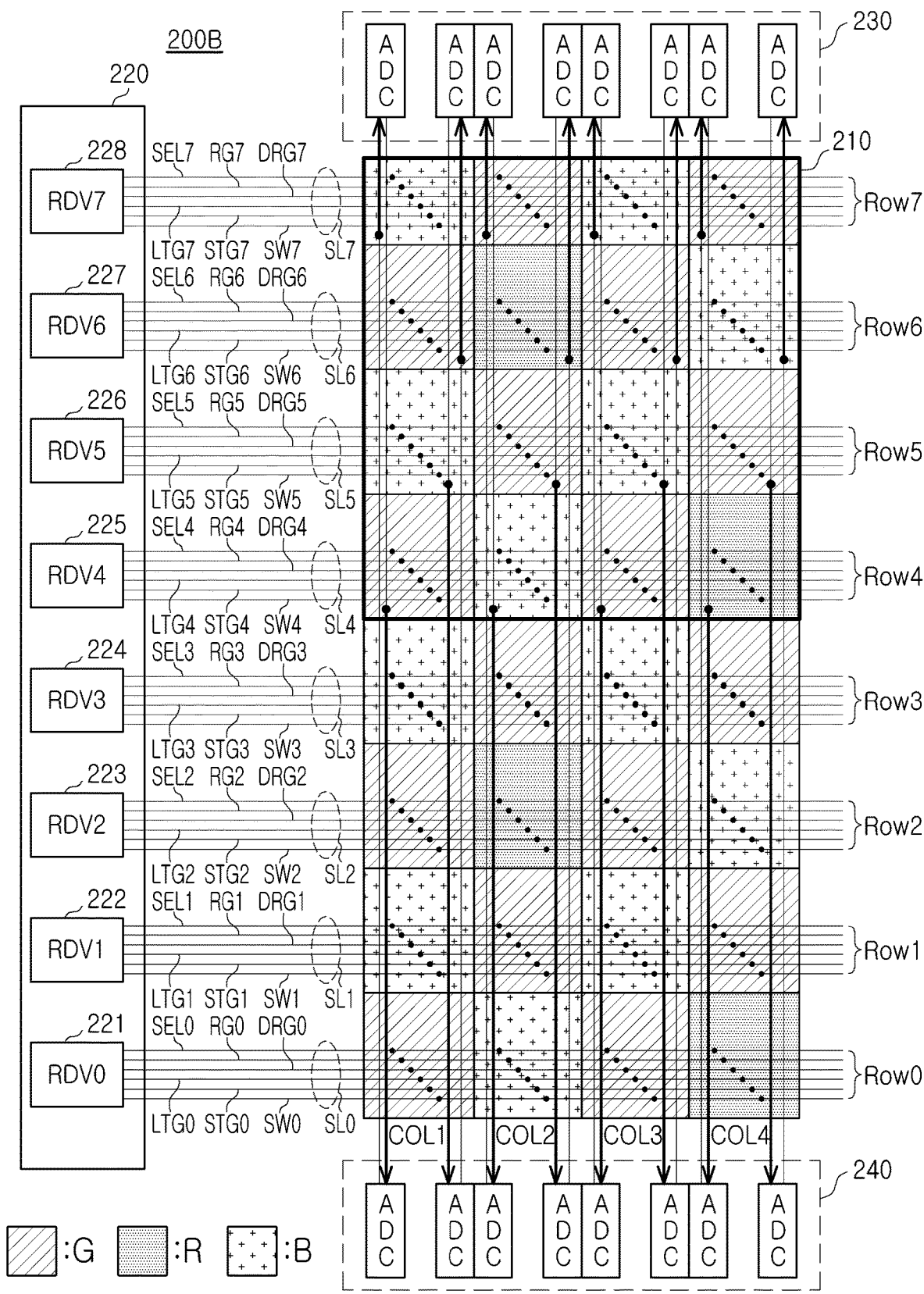

FIG. 4 is a diagram schematically illustrating a pixel array of an image sensor according to an example embodiment of the inventive concept, and FIGS. 5A and 5B are conceptual diagrams illustrating a readout method of an image sensor.

Referring to FIG. 4, a pixel array 210 of an image sensor according to an example embodiment of the inventive concept may include a plurality of pixels arranged in a first direction (an X-axis direction) and a second direction (a Y-axis direction). For example, the pixel array 210 may include red pixels R, green pixels G, and blue pixels B. Each of the red pixels R may include a red color filter, each of the green pixels G may include a green color filter, and each of the blue pixels B may include a blue color filter.

Referring to FIGS. 5A and 5B, image sensors 200A and 200B may include a pixel array 210, a row driver 220, an upper readout circuit 230, and a lower readout circuit 240, respectively. The upper readout circuit 230 and the lower readout circuit 240 may include ADCs corresponding to column lines COL1 to COL4, respectively. A portion of the column lines COL1 to COL4 may be input to ADCs of the upper readout circuit 230, and a portion of the column lines COL1 to COL4 may be input to ADCs of the lower readout circuit 240. For example, pixels connected to first row lines Row0, pixels connected to second row lines Row1, pixels connected to fifth row lines Row4, and pixels connected to sixth row lines Row5 may be connected to the lower readout circuit 240 through the column lines COL1 to COL4, and pixels connected to third row lines Row2, pixels connected to fourth row lines Row3, pixels connected to seventh row lines Row6, and pixels connected to eighth row lines Row7 may be connected to the upper readout circuit 230 through the column lines COL1 to COL4. According to another example embodiment, the image sensors 200A and 200B may further include switch elements for connecting the column lines COL1 to COL4 and the readout circuits 230 and 240, respectively.

The row driver 220 may select at least a portion of the plurality of row lines Row0 to Row7 of the pixel array 210, and may generate pixel control signals SEL0 to SEL7, RG0 to RG7, DRG0 to DRG7, LTG0 to LTG7, STG0 to STG7, and SW0 to SW7 for driving selected row lines Row0 to Row7. The row driver 220 may transmit the pixel control signals SEL0 to SEL7, RG0 to RG7, DRG0 to DRG7, LTG0 to LTG7, STG0 to STG7, and SW0 to SW7 to the plurality of row lines Row0 to Row7 of the pixel array 210.

The row driver 220 may include a first row driver circuit 221 generating first pixel control signals SEL0, RG0, DRG0, LTG0, STG0, and SW0 for driving the first row lines Row0, a second row driver circuit 222 generating second pixel control signals SEL1, RG1, DRG1, LTG1, STG1, and SW1 for driving the second row lines Row1, a third row driver circuit 223 generating third pixel control signals SEL2, RG2, DRG2, LTG2, STG2, and SW2 for driving the third row lines Row2, a fourth row driver circuit 224 generating fourth pixel control signals SEL3, RG3, DRG3, LTG3, STG3, and SW3 for driving the fourth row lines Row3, a fifth row driver circuit 225 generating fifth pixel control signals SEL4, RG4, DRG4, LTG4, STG4, and SW4 for driving the fifth row lines Row4, a sixth row driver circuit 226 generating sixth pixel control signals SEL5, RG5, DRG5, LTG5, STG5, and SW5 for driving the sixth row lines Row5, a seventh row driver circuit 227 generating seventh pixel control signals SEL6, RG6, DRG6, LTG6, STG6, and SW6 for driving the seventh row lines Row6, and an eighth row driver circuit 228 generating eighth pixel control signals SEL7, RG7, DRG7, LTG7, STG7, and SW7 for driving the eighth row lines Row7.

The row lines Row0 to Row7 included in different rows may receive pixel control signals from different row driver circuits 221 to 228.

FIG. 5A is a diagram illustrating a method of simultaneously reading pixel signals output from pixels connected to first to fourth row lines Row0 to Row3 by selecting the first to fourth row lines Row0 to Row3 and driving the first to fourth row lines Row0 to Row3 simultaneously, and FIG. 5B is a diagram illustrating a method of simultaneously reading pixel signals output from pixels connected to fifth to eighth row lines Row4 to Row7 by selecting the fifth to eighth row lines Row4 to Row7 and driving the fifth to eighth row lines Row4 to Row7 simultaneously.

First, referring to FIG. 5A, the first row driver circuit 221 may generate first pixel control signals SEL0, RG0, DRG0, LTG0, STG0, and SW0 for driving the first row lines Row0. The first row driver circuit 221 may output the first pixel control signals SEL0, RG0, DRG0, LTG0, STG0, and SW0 to first control signal lines SL0. The first row lines Row0 may receive the first pixel control signals SEL0, RG0, DRG0, LTG0, STG0, and SW0 from the first control signal lines SL0, and may be driven simultaneously, based on the first pixel control signals SEL0, RG0, DRG0, LTG0, STG0, and SW0.

The second row driver circuit 222 may generate second pixel control signals SEL1, RG1, DRG1, LTG1, STG1, and SW1 for driving the second row lines Row1. The second row driver circuit 222 may output the second pixel control signals SEL1, RG1, DRG1, LTG1, STG1, and SW1 to second control signal lines SL1. The second row lines Row1 may receive the second pixel control signals SEL1, RG1, DRG1, LTG1, STG1, and SW1 from the second control signal lines SL1, and may be driven simultaneously, based on the second pixel control signals SEL1, RG1, DRG1, LTG1, STG1, and SW1.

The third row driver circuit 223 may generate third pixel control signals SEL2, RG2, DRG2, LTG2, STG2, and SW2 for driving the third row lines Row2. The third row driver circuit 223 may output the third pixel control signals SEL2, RG2, DRG2, LTG2, STG2, and SW2 to third control signal lines SL2. The third row lines Row2 may receive the third pixel control signals SEL2, RG2, DRG2, LTG2, STG2, and SW2 from the third control signal lines SL2, and may be driven simultaneously, based on the third pixel control signals SEL2, RG2, DRG2, LTG2, STG2, and SW2.

The fourth row driver circuit 224 may generate fourth pixel control signals SEL3, RG3, DRG3, LTG3, STG3, and SW3 for driving the fourth row lines Row3. The fourth row driver circuit 224 may output the fourth pixel control signals SEL3, RG3, DRG3, LTG3, STG3, and SW3 to fourth control signal lines SL3. The fourth row lines Row3 may receive the fourth pixel control signals SEL3, RG3, DRG3, LTG3, STG3, and SW3 from the fourth control signal lines SL3, and may be driven simultaneously, based on the fourth pixel control signals SEL3, RG3, DRG3, LTG3, STG3, and SW3.

Pixel signals output from pixels connected to the first and second row lines Row0 and Row1 may be output to the lower readout circuit 240 through the column lines COL1 to COL4. Pixel signals output from pixels connected to the third and fourth row lines Row2 and Row3 may be output to the upper readout circuit 230 through the column lines COL1 to COL4. Therefore, the pixel signals output from the pixels connected to the first to fourth row lines Row0 to Row3 may be simultaneously read.

Referring to FIG. 5B, the fifth row driver circuit 225 may generate fifth pixel control signals SEL4, RG4, DRG4, LTG4, STG4, and SW4 for driving the fifth row lines Row4. The fifth row driver circuit 225 may output the fifth pixel control signals SEL4, RG4, DRG4, LTG4, STG4, and SW4 to fifth control signal lines SL4. The fifth row lines Row4 may receive the fifth pixel control signals SEL4, RG4, DRG4, LTG4, STG4, and SW4 from the fifth control signal lines SL4, and may be driven simultaneously, based on the fifth pixel control signals SEL4, RG4, DRG4, LTG4, STG4, and SW4.

The sixth row driver circuit 226 may generate sixth pixel control signals SEL5, RG5, DRG5, LTG5, STG5, and SW5 for driving the sixth row lines Row5. The sixth row driver circuit 226 may output the sixth pixel control signals SEL5, RG5, DRG5, LTG5, STG5, and SW5 to sixth control signal lines SL5. The sixth row lines Row5 may receive the sixth pixel control signals SEL5, RG5, DRG5, LTG5, STG5, and SW5 from the sixth control signal lines SL5, and may be driven simultaneously, based on the sixth pixel control signals SEL5, RG5, DRG5, LTG5, STG5, and SW5.

The seventh row driver circuit 227 may generate seventh pixel control signals SEL6, RG6, DRG6, LTG6, STG6, and SW6 for driving the seventh row lines Row6. The seventh row driver circuit 227 may output the seventh pixel control signals SEL6, RG6, DRG6, LTG6, STG6, and SW6 to seventh control signal lines SL6. The seventh row lines Row6 may receive the seventh pixel control signals SEL6, RG6, DRG6, LTG6, STG6, and SW6 from the seventh control signal lines SL6, and may be driven simultaneously, based on the seventh pixel control signals SEL6, RG6, DRG6, LTG6, STG6, and SW6.

The eighth row driver circuit 228 may generate eighth pixel control signals SEL7, RG7, DRG7, LTG7, STG7, and SW7 for driving the eighth row lines Row7. The eighth row driver circuit 228 may output the eighth pixel control signals SEL7, RG7, DRG7, LTG7, STG7, and SW7 to eighth control signal lines SL7. The eighth row lines Row7 receive the eighth pixel control signals SEL7, RG7, DRG7, LTG7, STG7, and SW7 from the eighth control signal lines SL7, and may be driven simultaneously, based on the eighth pixel control signals SEL7, RG7, DRG7, LTG7, STG7, and SW7.

Pixel signals output from pixels connected to the fifth and sixth row lines Row4 and Row5 may be output to the lower readout circuit 240 through the column lines COL1 to COL4. Pixel signals output from pixels connected to the seventh and eighth row lines Row6 and Row7 may be output to the upper readout circuit 230 through the column lines COL1 to COL4. Therefore, the pixel signals output from the pixels connected to the fifth to eighth row lines Row4 to Row7 may be simultaneously read.

In the image sensors described with reference to FIGS. 5A and 5B, a separate row driver circuit may be required to drive row lines included in each of the rows. For example, the row lines Row0 to Row7 included in different rows may receive pixel control signals from the different row driver circuits 221 to 228.

According to an example embodiment of the inventive concept, in a multi-row simultaneous readout method of simultaneously driving a plurality of rows to process pixel signals, when pixel control signals having the same timing sequence may be input to rows to be simultaneously driven, to independently control corresponding pixels, a row driver circuit may control a plurality of rows. A method for achieving this will be described in detail below with reference to FIG. 6.

Figure 6:
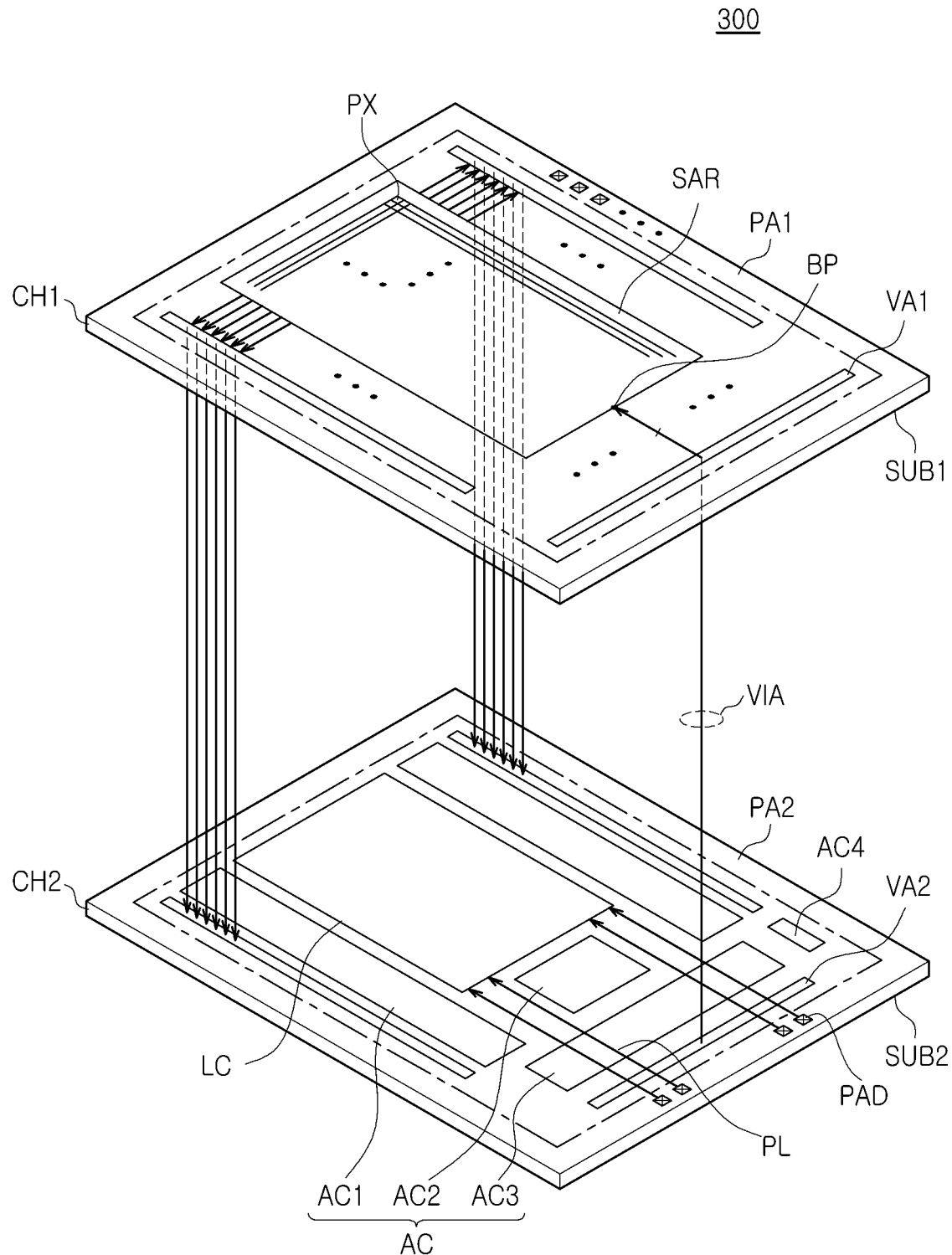
FIG. 6 is a perspective view illustrating an image sensor according to an example embodiment of the inventive concept.

FIG. 6 is a perspective view illustrating an image sensor according to an example embodiment of the inventive concept.

Referring to FIG. 6 focusing on differences from FIG. 2, in an image sensor 300, row lines included in rows driven simultaneously may share control signal lines connected to a row driver circuit. The row lines may receive pixel control signals in common from the control signal lines at a branch point BP of a first layer CH1.

The branch point BP may be provided adjacent to a boundary of a pixel array region SAR included in the first layer CH1. The control signal lines may be connected from a row driver AC3 to the branch point BP through a first via region VA1 and a second via region VA2. The second via region VA2 may not overlap the pixel array region SAR in a direction, perpendicular to an upper surface of the first layer CH1.

For example, when four rows are simultaneously driven, the number of vias VIA of FIG. 6 may be reduced to ¼ compared to the number of vias VIA of FIG. 2. As the number of control signal lines decreases, routing of the control signal lines between the pixel array region SAR and the first via region VA1 may be easy. In addition, since a row driver circuit is provided to drive four row lines, a size of the row driver AC3 of FIG. 6 may be reduced to ¼ compared to a size of the row driver AC3 of FIG. 2.

Since the size of the row driver AC3 is reduced and the number of vias VIA is reduced, a width of a power line PL for supplying power from a logic power pad PAD to a logic circuit LC may increase. In addition, the number of stacked layers that may be used as the power line PL may increase. Therefore, sufficient power may be supplied to the logic circuit LC. In addition, a space occupied by the row driver AC3 may be used as a region of the logic circuit LC.

Figure 7A:
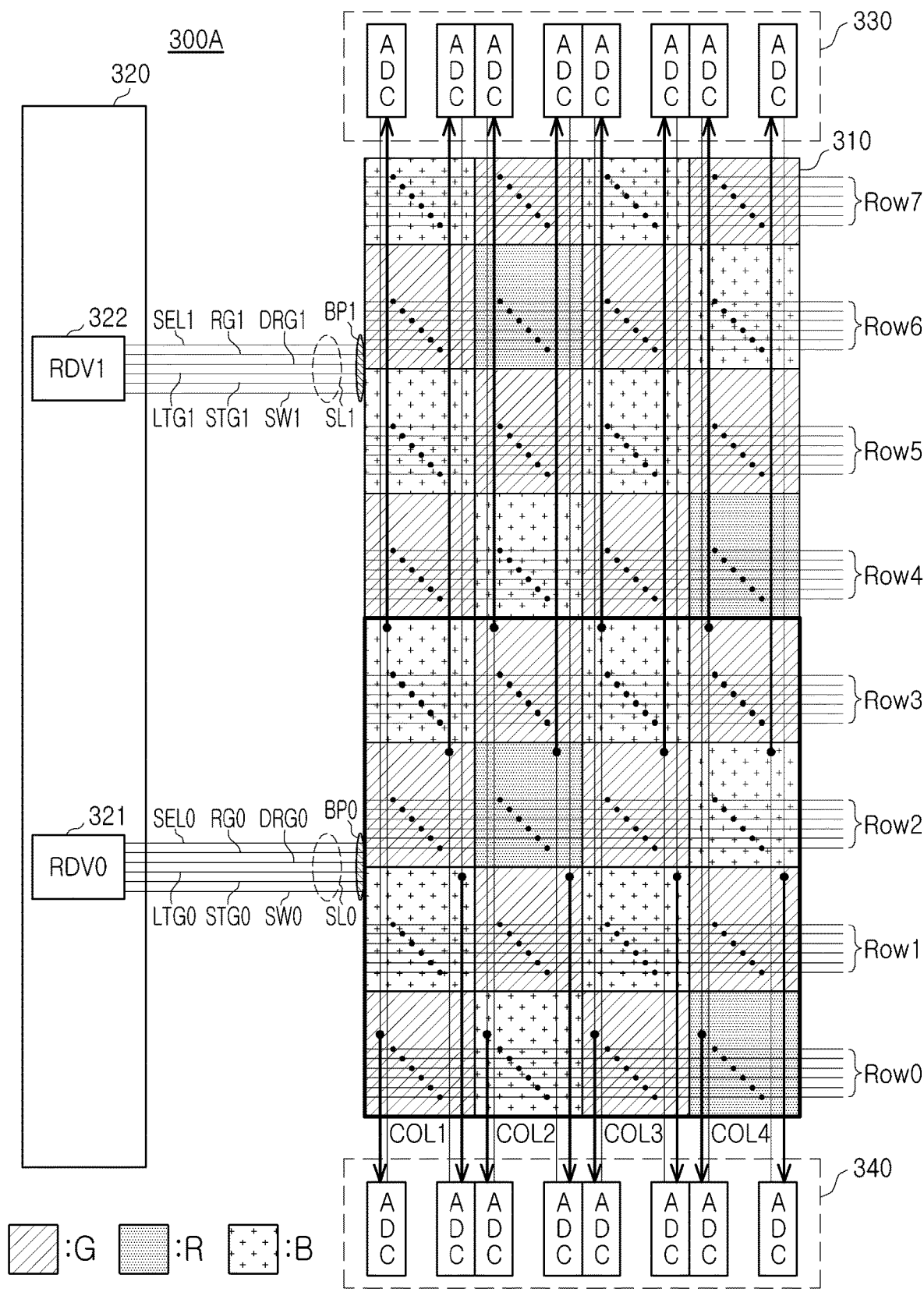
FIGS. 7A and 7B are conceptual diagrams illustrating a readout method of an image sensor according to an example embodiment of the inventive concept.
Figure 7B:
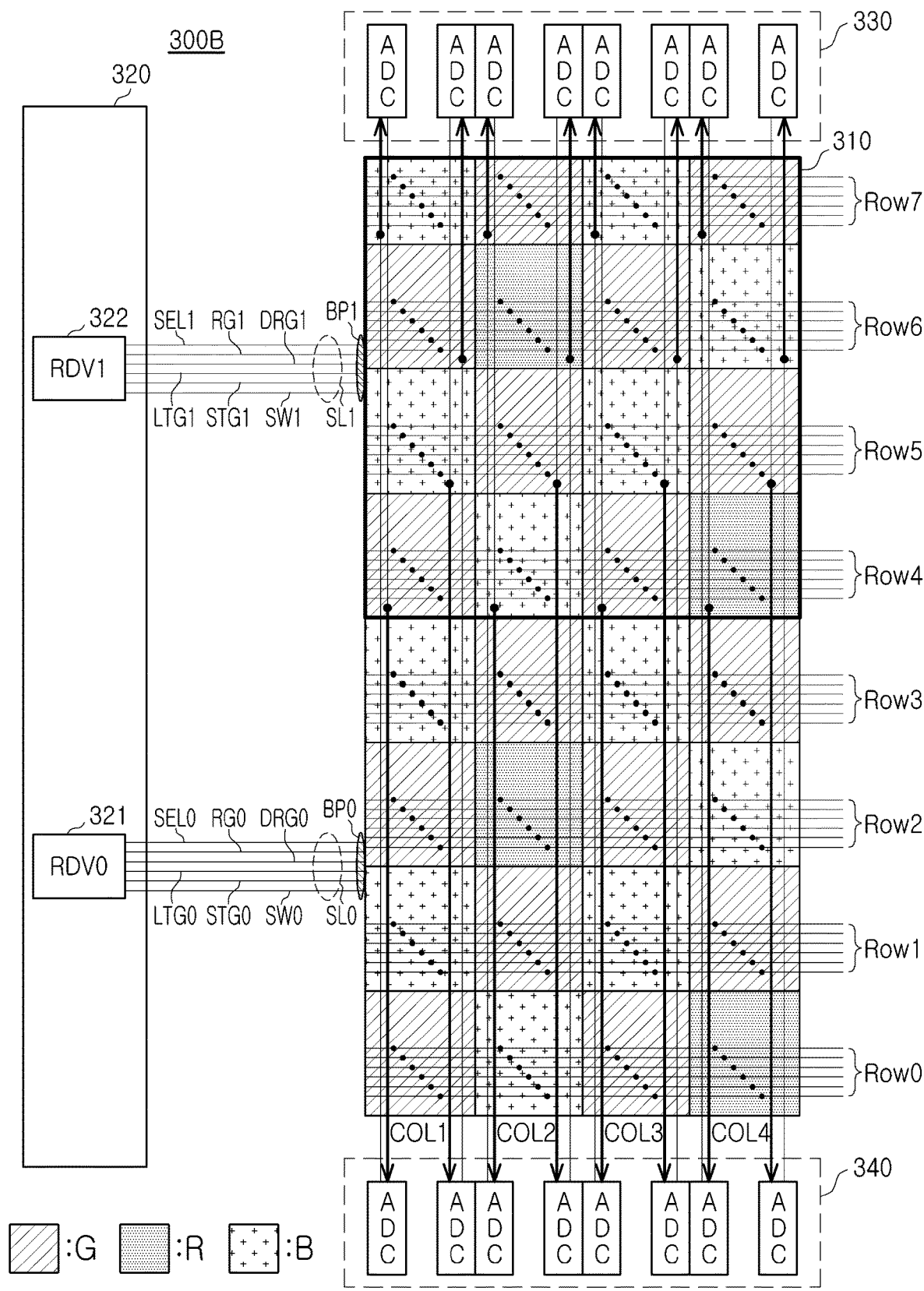

FIGS. 7A and 7B are conceptual diagrams illustrating a readout method of an image sensor according to an example embodiment of the inventive concept.

First, referring to FIG. 7A focusing on differences from FIG. 5A, first to fourth row lines Row0 to Row3 may share first control signal lines SL0.

A first row driver circuit 321 may generate first pixel control signals SEL0, RG0, DRG0, LTG0, STG0, and SW0. The first row driver circuit 321 may output the first pixel control signals SEL0, RG0, DRG0, LTG0, STG0, and SW0 to the first control signal lines SL0.

At a first branch point BP0, the first to fourth row lines Row0 to Row3 may receive the first pixel control signals SEL0, RG0, DRG0, LTG0, STG0, and SW0 through the first control signal lines SL0 in common. Therefore, the first pixel control signals SEL0, RG0, DRG0, LTG0, STG0, and SW0 may simultaneously drive the first to fourth row lines Row0 to Row3. Pixel signals output from pixels connected to the first and second row lines Row0 and Row1 may be output to a lower readout circuit 340 through column lines COL1 to COL4. Pixel signals output from pixels connected to the third and fourth row lines Row2 and Row3 may be output to an upper readout circuit 330 through the column lines COL1 to COL4. Therefore, the pixel signals output from the pixels connected to the first to fourth row lines Row0 to Row3 may be simultaneously read.

The number (e.g., 6) of first control signal lines SL0 shared by selected row lines Row0 to Row3 may be less than the number (e.g., 24) of selected row lines Row0 to Row3, and may be equal to the number of row lines (e.g., Row0) included in a row.

Also, the first pixel control signals SEL0, RG0, DRG0, LTG0, STG0, and SW0 for driving the selected row lines Row0 to Row3 may be generated by a row driver circuit 321.

Referring to FIG. 7B focusing on differences from FIG. 5B, fifth to eighth row lines Row4 to Row7 may share second control signal lines SL1.

A second row driver circuit 322 may generate second pixel control signals SEL1, RG1, DRG1, LTG1, STG1, and SW1. The second row driver circuit 322 may output the second pixel control signals SEL1, RG1, DRG1, LTG1, STG1, and SW1 to the second control signal lines SL1.

At a second branch point BP1, the fifth to eighth row lines Row4 to Row7 may receive the second pixel control signals SEL1, RG1, DRG1, LTG1, STG1, and SW1 through the second control signal lines SL1 in common. Therefore, the second pixel control signals SEL1, RG1, DRG1, LTG1, STG1, and SW1 may simultaneously drive the fifth to eighth row lines Row4 to Row7. Pixel signals output from pixels connected to the fifth and sixth row lines Row4 and Row5 may be output to a lower readout circuit 340 column lines COL1 to COL4. Pixel signals output from pixels connected to the seventh and eighth row lines Row6 and Row7 may be output to an upper readout circuit 330 through the column lines COL1 to COL4. Therefore, the pixel signals output from the pixels connected to the fifth to eighth row lines Row4 to Row7 may be simultaneously read.

The number (e.g., 6) of the second control signal lines SL1 shared by selected row lines Row4 to Row7 may be less than the number (e.g., 24) of selected row lines Row4 to Row7, and may be equal to the number of row lines (e.g., Row4) included in a row.

Also, the second pixel control signals SEL1, RG1, DRG1, LTG1, STG1, and SW1 for driving the selected row lines Row4 to Row7 may be generated by a row driver circuit 322.

As described with reference to FIGS. 7A and 7B, the row lines Row0 to Row7 included in a plurality of rows may share the control signal lines SL0 and SL1 connected to a row driver circuit, and may receive pixel control signals in common from the control signal lines SL0 and SL1. Therefore, a row driver circuit may drive a plurality of rows simultaneously.

Figure 8:
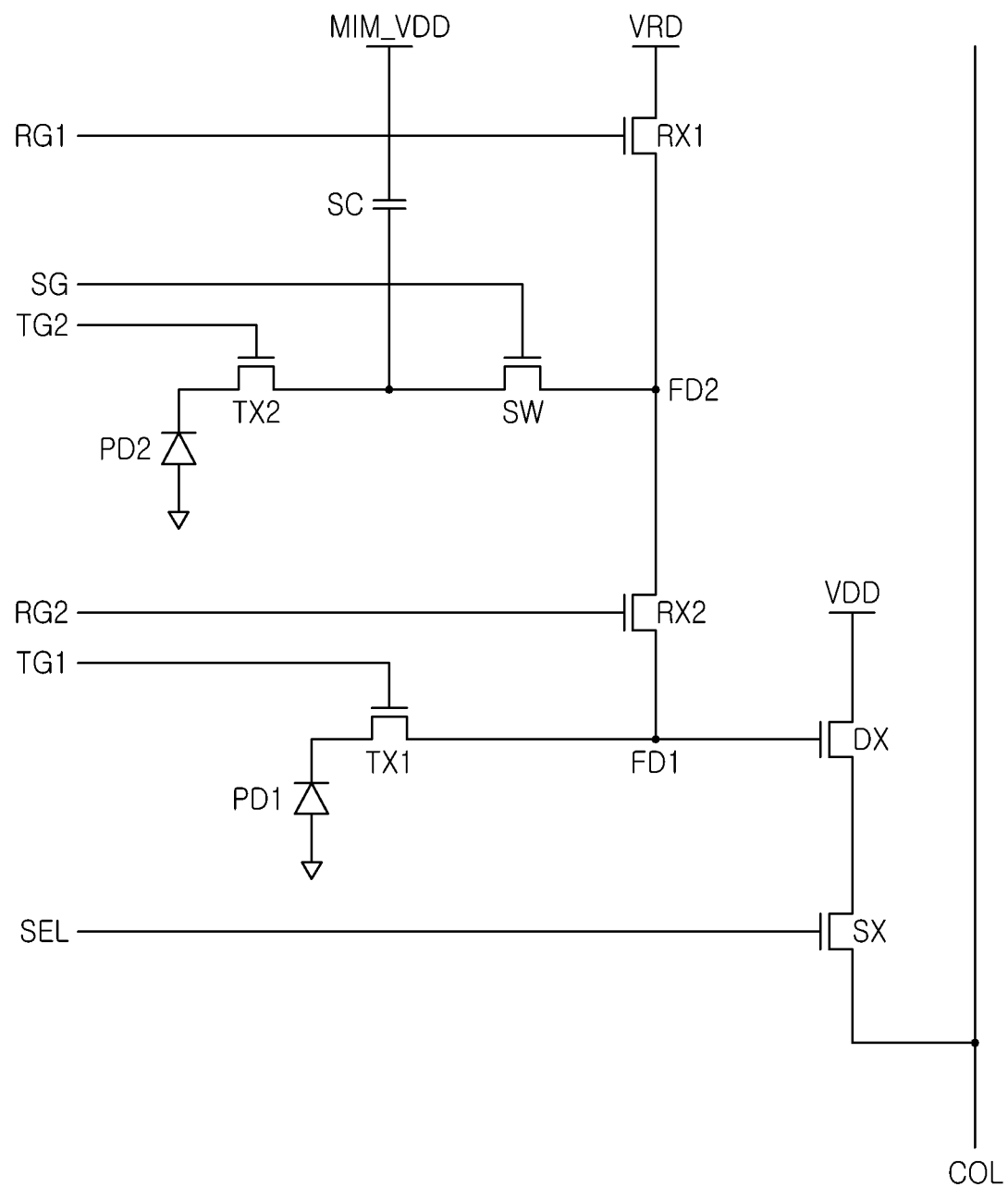
FIG. 8 is a diagram schematically illustrating a pixel circuit of an image sensor according to an example embodiment of the inventive concept.

FIG. 8 is a diagram schematically illustrating a pixel circuit of an image sensor according to an example embodiment of the inventive concept.

A pixel circuit of FIG. 8 may correspond to a pixel PX of FIG. 4. Therefore, an image sensor according to an example embodiment of the inventive concept may have a non-shared structure in which pixels do not share a floating diffusion region.

Referring to FIG. 8, a pixel circuit may include photodiodes PD1 and PD2, transfer transistors TX1 and TX2, reset transistors RX1 and RX2, a storage capacitor SC, a switch element SW, a driving transistor DX, a select transistor SX, and the like. The pixel circuit may be connected to a readout circuit of an image sensor through a column line COL connected to the select transistor SX, and the readout circuit may acquire a reset voltage and a pixel voltage through the column line COL to generate a pixel signal. A first photodiode PD1 may have a larger light receiving area than a second photodiode PD2.

A first floating diffusion region FD1, a first transfer transistor TX1, a first reset transistor RX1, the driving transistor DX, and the select transistor SX may form a first pixel circuit. The first pixel circuit may output an electric signal using a charge generated by the first photodiode PD1. The first transfer transistor TX1 may operate in response to a first transfer control signal TG1, the first reset transistor RX1 may operate in response to a first reset control signal RG1, and the select transistor SX may operate in response to a select signal SEL.

A second floating diffusion region FD2, a second transfer transistor TX2, a second reset transistor RX2, a storage capacitor SC, the switch element SW, the driving transistor DX, and the select transistor SX may form a second pixel circuit. The second pixel circuit may output an electric signal using a charge generated by the second photodiode PD2. The second transfer transistor TX2 may operate in response to a second transfer control signal TG2, the second reset transistor RX2 may operate in response to a second reset control signal RG2, and the switch element SW may operate in response to a switch control signal SG.

A first driving power MIM_VDD and a second driving power VRD may be output voltages of a regulator.

Figure 9:
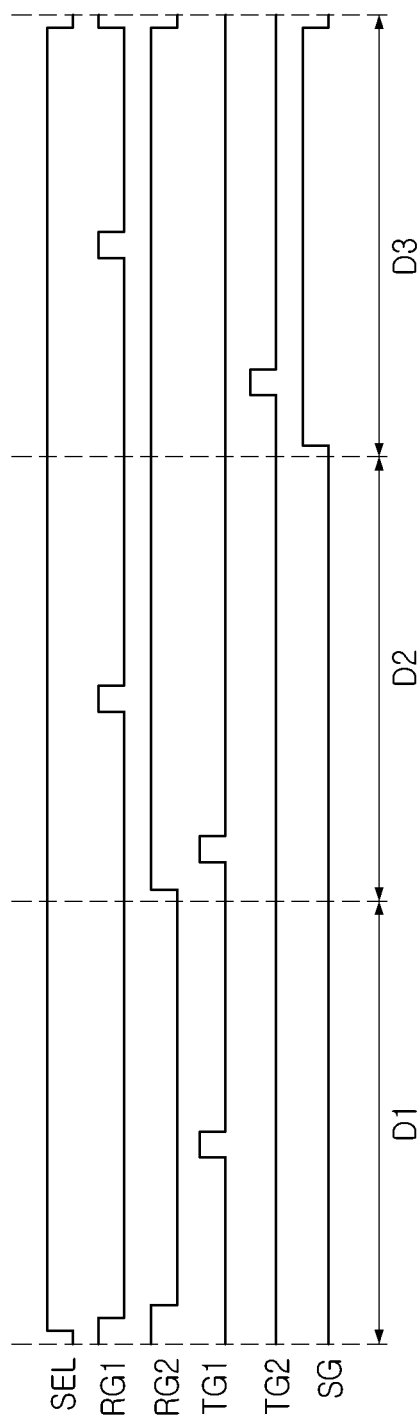
FIG. 9 is a timing diagram illustrating an operation of the pixel circuit of FIG. 8.

FIG. 9 is a timing diagram illustrating an operation of the pixel circuit of FIG. 8.

Referring to FIG. 9, a period in time required to read a reset voltage and a pixel voltage from pixels connected to selected row lines may be defined as a horizontal cycle, and FIG. 9 illustrates an operation of a pixel circuit during a horizontal cycle. A section D1, a second section D2, and a third section D3 will be described.

Referring to FIGS. 8 and 9 together, during the first section D1, the first transfer transistor TX1 may transfer charges accumulated in the first photodiode PD1, based on the first transfer control signal TG1 transmitted from a row driver, to the first floating diffusion region FD1. The driving transistor DX may amplify the charges accumulated in the first floating diffusion region FD1, and may transfer the amplified charges to the select transistor SX.

During the second section D2, the second reset transistor RX2 may be turned on to connect the first floating diffusion region FD1 and the second floating diffusion region FD2 to each other. Therefore, a conversion gain may be reduced. In the first transfer transistor TX1, the charges accumulated in the first photodiode PD1 may be accumulated in the first floating diffusion region FD1 and the second floating diffusion region FD2, based on the first transfer control signal TG1 transmitted from the row driver, and may be converted into a voltage by the driving transistor DX.

During the third section D3, the storage capacitor SC may store the charge in response to an amount of charges generated by the second photodiode PD2 and an operation of the second transfer transistor TX2. As the switch element SW is turned on, charges of the storage capacitor SC may move to the first floating diffusion region FD1 and the second floating diffusion region FD2.

Image data obtained from the first photodiode PD1 during the first section D1, image data obtained from the first photodiode PD1 during the second section D2, and image data obtained from the second photodiode PD2 during the third section D3 may be combined into one.

Since the pixel circuit of FIG. 8 has a non-shared structure and eliminates a high dynamic range (HDR) function in one pixel itself, pixels in rows driven simultaneously may operate independently of each other. Therefore, the image sensor described with reference to FIGS. 8 and 9 may have a structure suitable for a row driver circuit to control a plurality of rows.

Hereinafter, for convenience of description, transfer control signals among pixel control signals will be mainly described.

Figure 10:
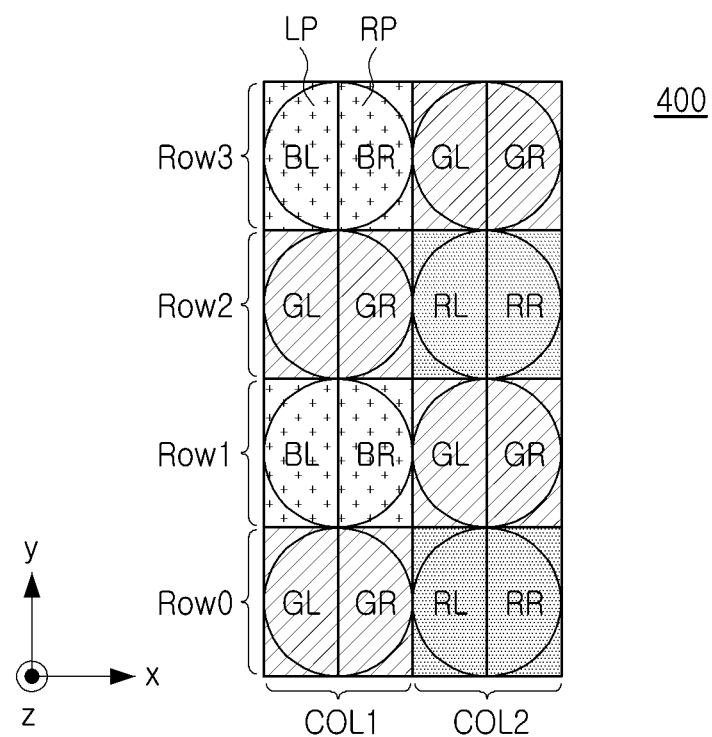
FIG. 10 is a diagram schematically illustrating a pixel array of an image sensor according to an example embodiment of the inventive concept.
Figure 11A:
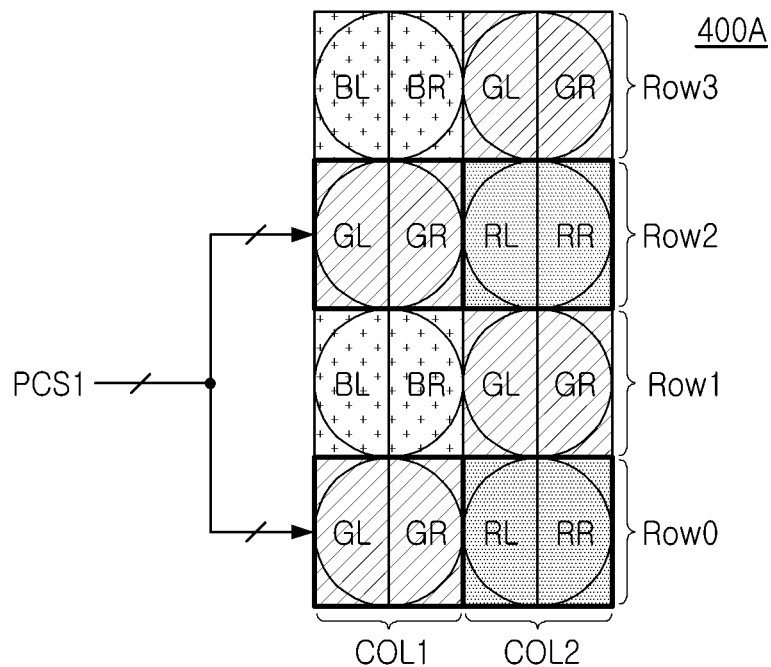
FIGS. 11A and 11B are conceptual diagrams illustrating a readout method of an image sensor.
Figure 11B:
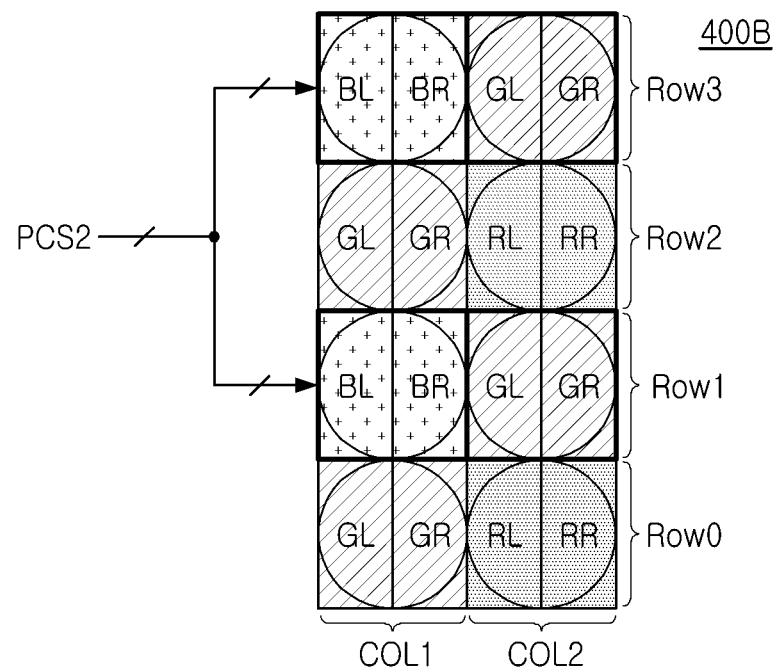

FIG. 10 is a diagram schematically illustrating a pixel array of an image sensor according to an example embodiment of the inventive concept, and FIGS. 11A and 11B are conceptual diagrams illustrating a readout method of an image sensor.

Referring to FIG. 10, a pixel array 400 of an image sensor according to an example embodiment of the inventive concept may include a plurality of pixels arranged in a first direction (an X-axis direction) and a second direction (a Y-axis direction). For example, the pixel array 400 may include red pixels R, green pixels G, and blue pixels B. Each of the red pixels R may include a red color filter, each of the green pixels G may include a green color filter, and each of the blue pixels B may include a blue color filter.

Each of the pixels of the pixel array 400 may be independently controlled to detect a phase difference for autofocus. Each of the pixels may include a first photoelectric conversion element LP and a second photoelectric conversion element RP. When each of the pixels includes a plurality of photoelectric conversion elements LP and RP, the pixel array 400 may be referred to as a full phase detection auto focus or full phase difference auto focus (PAF) pixel array.

Referring to FIG. 11A, an image sensor 400A may select first and third row lines Row0 and Row2 during a first horizontal cycle, and may simultaneously drive the first and third row lines Row0 and Row2, to simultaneously read pixel signals output from pixels connected to the first and third row lines Row0 and Row2. For example, the pixels of the first and third row lines Row0 and Row2 that may be simultaneously driven may operate in response to first pixel control signals PCS1 having the same timing sequence.

Referring to FIG. 11B, an image sensor 400B may select second and fourth row lines Row1 and Row3 during a second horizontal cycle, and may simultaneously drive the second and fourth row lines Row1 and Row3, to simultaneously read pixel signals output from pixels connected to the second and fourth row lines Row1 and Row3. For example, the pixels of the second and fourth row lines Row1 and Row3 that may be simultaneously driven may operate in response to second pixel control signals PCS2 having the same timing sequence.

The first pixel control signals PCS1 and the second pixel control signals PCS2 may be signals having the same timing sequence.

Figure 12:
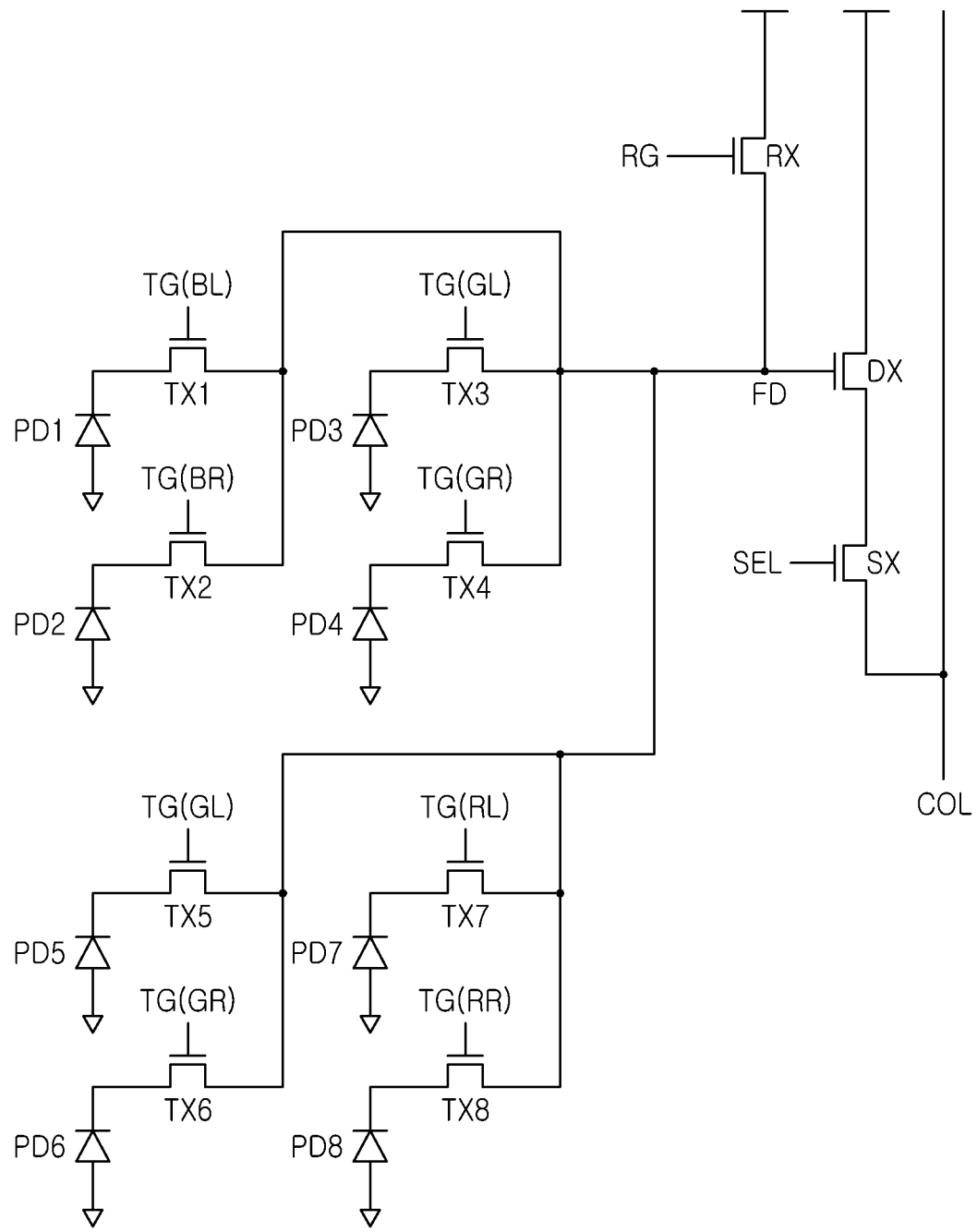
FIG. 12 is a diagram schematically illustrating a pixel circuit of an image sensor according to an example embodiment of the inventive concept.

FIG. 12 is a diagram schematically illustrating a pixel circuit of an image sensor according to an example embodiment of the inventive concept. A pixel circuit of FIG. 12 may be a diagram illustrating four pixels of FIG. 10.

Referring to FIG. 12, a pixel circuit may include photodiodes PD1 to PD8, transfer transistors TX1 to TX8, a reset transistor RX, a driving transistor DX, a select transistor SX, and the like. Two photodiodes may correspond to a pixel, and four pixels may share a floating diffusion region FD. The pixel circuit may be connected to a readout circuit of an image sensor through a column line COL connected to the select transistor SX, and the readout circuit may acquire a reset voltage and a pixel voltage through the column line COL to generate a pixel signal. A pixel may include two photodiodes.

Figure 13:
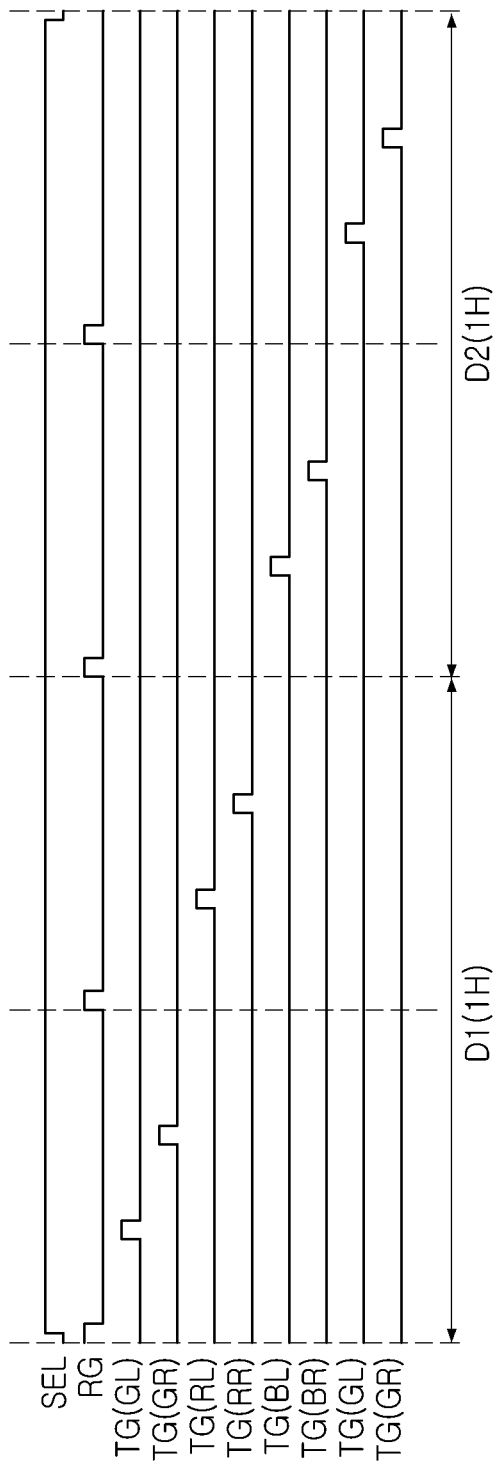
FIG. 13 is a timing diagram illustrating an operation of the pixel circuit of FIG. 12.

FIG. 13 is a timing diagram illustrating an operation of the pixel circuit of FIG. 12.

An operation of a first horizontal cycle D1 and an operation of a second horizontal cycle D2 will be described with reference to FIG. 13. Referring to FIGS. 10 to 13, fifth to eighth transfer control signals TG(GL), TG(GR), TG(RL), and TG(RR) may be transmitted to pixels connected to first row lines Row0 and third row lines Row2 during the first horizontal cycle D1. Fifth to eighth transfer transistors TX5 to TX8 may be connected to the fifth to eighth transfer control signals TG(GL), TG(GR), TG(RL), and TG(RR) transmitted from a row driver. Based on this, charges respectively accumulated in photodiodes PD4 to PD8 may be sequentially transferred to a floating diffusion region FD.

First to fourth transfer control signals TG(BL), TG(BR), TG(GL), and TG(GR) may be transmitted to pixels connected to second row lines Row1 and fourth row lines Row3 during the second horizontal cycle D2. First to fourth transfer transistors TX1 to TX4 may be connected to the first to fourth transfer control signals TG(BL), TG(BR), TG(GL), and TG(GR) transmitted from the row driver. Based on this, charges respectively accumulated in photodiodes PD1 to PD4 may be sequentially transferred to the floating diffusion region FD.

A readout circuit may process pixel signals output from pixels included in a pixel array included in a image sensor (400), and may generate first image data and second image data, corresponding to the pixel signals. For example, the first image data may refer to data generated by first photoelectric conversion elements BL, GL, and RL included in each of the pixels, and the second image data may refer to second photoelectric conversion elements BR, GR, and RR included in each of the pixels. A signal processing circuit may generate a left image using the first image data, and may generate a right image using the second image data.

Since an image sensor described with reference to FIGS. 12 and 13 operates in response to pixel control signals in which pixels of rows driven simultaneously have the same timing sequence, the image sensor may have a structure suitable for controlling a plurality of rows by a row driver circuit.

Figure 14:
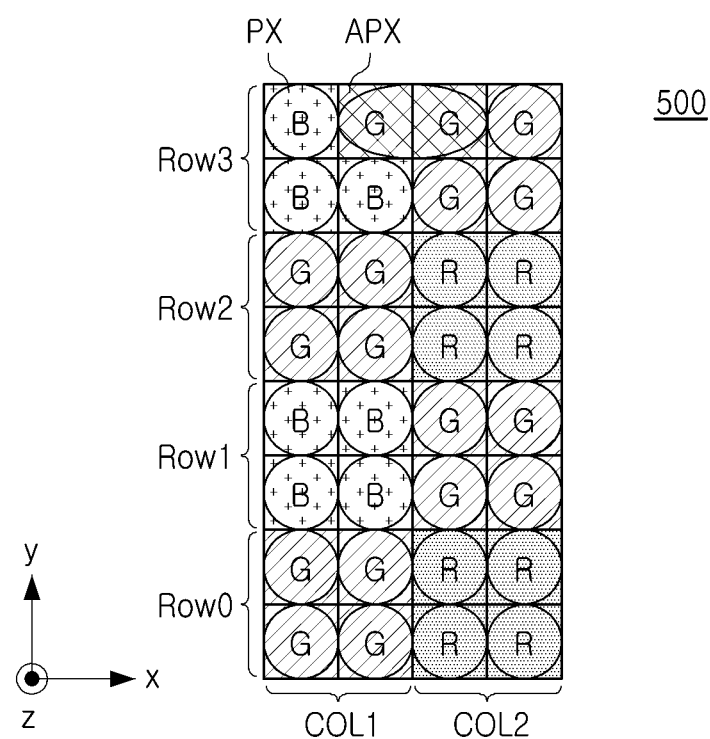
FIG. 14 is a diagram schematically illustrating a pixel array of an image sensor according to an example embodiment of the inventive concept.
Figure 15A:
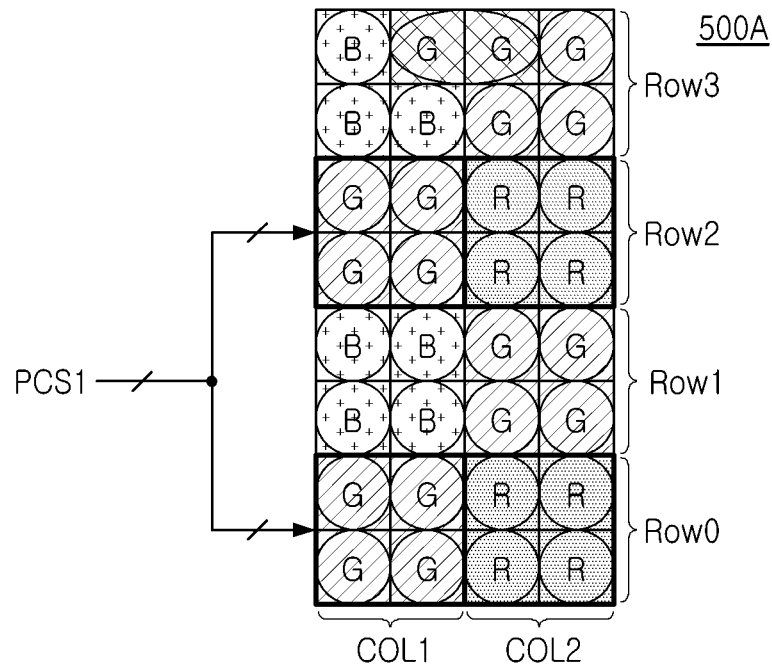
FIGS. 15A and 15B are conceptual diagrams illustrating a readout method of an image sensor.
Figure 15B:
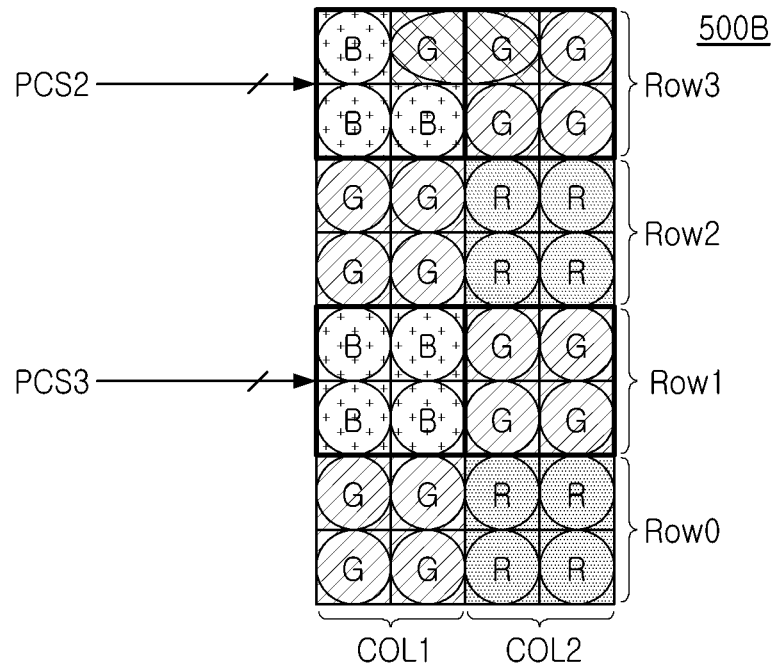

FIG. 14 is a diagram schematically illustrating a pixel array of an image sensor according to an example embodiment of the inventive concept, and FIGS. 15A and 15B are conceptual diagrams illustrating a readout method of an image sensor.

Referring to FIG. 14, a pixel array of an image sensor 500 according to an example embodiment of the inventive concept may include a plurality of pixels arranged in a first direction (an X-axis direction) and a second direction (a Y-axis direction). For example, the pixel array may include red pixels R, green pixels G, and blue pixels B. Each of the red pixels R may include a red color filter, each of the green pixels G may include a green color filter, and each of the blue pixels B may include a blue color filter.

A pair of pixels adjacent to each other in the first direction or the second direction in the pixel array may provide an autofocus pixel blocks APX. The pair of pixels included in the auto focus pixel blocks APX may include a color filter (e.g., a green color filter or a white color filter) having the same color. The pair of pixels included in the autofocus pixel blocks APX may share a microlens, and may have a different radius of curvature than the microlens included in normal pixels.

The image sensor 500 may operate in a full mode and a binning mode. The full mode may mean performing sampling and holding, and analog-to-digital converting operations on voltages sensed by all unit pixels constituting the pixel array of the image sensor. The binning mode may mean outputting a value obtained by summing output values of pixels of the same type as a sensing voltage. For example, a 4-sum mode may mean outputting a value obtained by summing outputs of four pixels as a sensing voltage.

FIGS. 15A and 15B are conceptual diagrams illustrating a readout method of an image sensor in a 4-sum mode.

Referring to FIG. 15A, an image sensor 500A may select first and third row lines Row0 and Row2 during a first horizontal cycle, and may simultaneously drive the first and third row lines Row0 and Row2, to simultaneously read pixel signals output from pixels connected to the first and third row lines Row0 and Row2. For example, the pixels of the first and third row lines Row0 and Row2 that may be simultaneously driven may operate in response to first pixel control signals PCS1 having the same timing sequence.

Referring to FIG. 15B, an image sensor 500B may select second and fourth row lines Row1 and Row3 during a second horizontal cycle, and may simultaneously drive the second and fourth row lines Row1 and Row3, to simultaneously read pixel signals output from pixels connected to the second and fourth row lines Row1 and Row3. Unlike FIG. 15A, in FIG. 15B, the second and fourth row lines Row1 and Row3 driven simultaneously need to be separately controlled. This may be because the fourth row lines Row3 include the autofocus pixel blocks APX, and the autofocus pixel blocks APX need to be controlled differently from normal pixels. Therefore, pixels of the second row lines Row1 may operate in response to third pixel control signals PCS3, and pixels included in the fourth row lines Row3 may operate in response to second pixel control signals PCS2.

Figure 16:
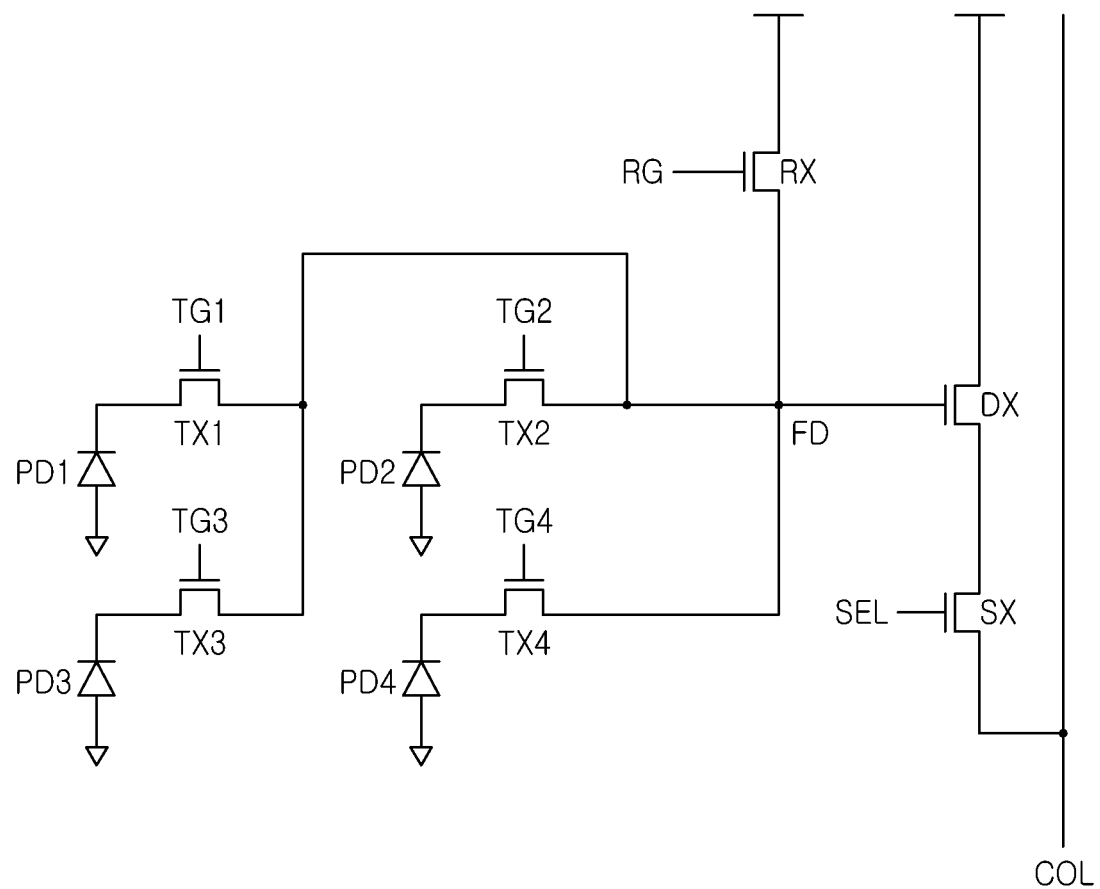
FIG. 16 is a diagram schematically illustrating a pixel circuit of an image sensor according to an example embodiment of the inventive concept.

FIG. 16 is a diagram schematically illustrating a pixel circuit of an image sensor according to an example embodiment of the inventive concept. The pixel circuit of FIG. 16 may correspond to four pixels of FIG. 14.

Referring to FIG. 16, a pixel circuit may include photodiodes PD1 to PD4, transfer transistors TX1 to TX4, a reset transistor RX, a driving transistor DX, a select transistor SX, and the like. Four pixels included in the pixel circuit may share a floating diffusion region FD. The pixel circuit may be connected to a readout circuit of an image sensor through a column line COL connected to the select transistor SX, and the readout circuit may acquire a reset voltage and a pixel voltage through the column line COL to generate a pixel signal.

Figure 17:
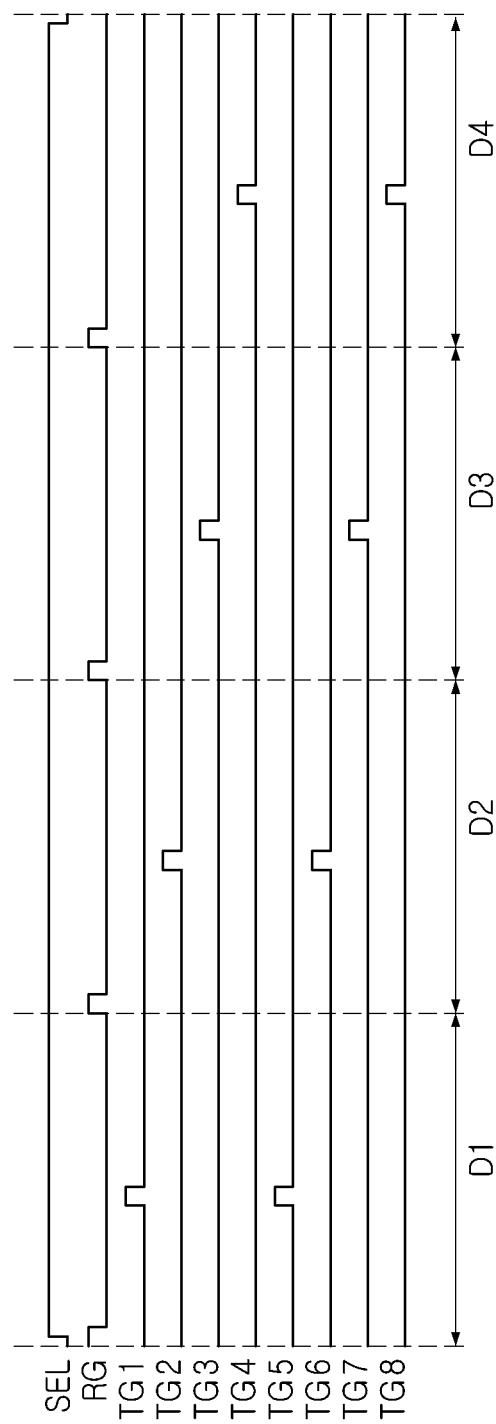
FIGS. 17, 18A, and 18B are timing diagrams illustrating an operation of the pixel circuit of FIG. 16.
Figure 18A:
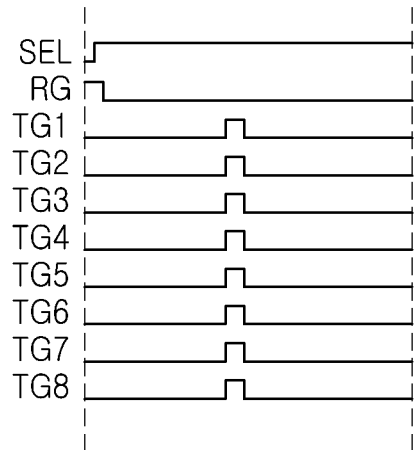
Figure 18B:
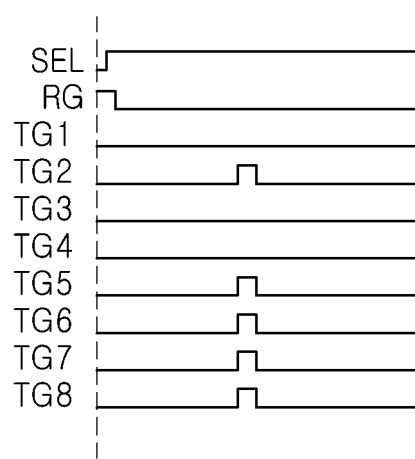

FIGS. 17, 18A, and 18B are timing diagrams illustrating an operation of the pixel circuit of FIG. 16.

Referring to FIGS. 17, 18A, and 18B, first to fourth transfer control signals TG1 to TG4 transmitted to first row lines Row0 and second row lines Row1, and fifth to eighth transfer control signals TG5 to TG8 transmitted to third row lines Row2 and fourth row lines Row3 have only different expressions, but may correspond to transfer control signals TG1 to TG4 controlling the photodiodes PD1 to PD4 in the pixel circuit of FIG. 16.

First, referring to FIG. 17, in a full mode, during a first horizontal cycle D1, a first transfer control signal TG1 may be transmitted to the first row lines Row0, and a fifth transfer control signal TG5 may be transmitted to the third row lines Row2. During a second horizontal cycle D2, a second transfer control signal TG2 may be transmitted to the first row lines Row0, and a sixth transfer control signal TG6 may be transmitted to the third row lines Row2. During a third horizontal cycle D3, a third transfer control signal TG3 may be transmitted to the first row lines Row0, and a seventh transfer control signal TG7 may be transmitted to the third row lines Row2. During a fourth horizontal cycle D4, a fourth transfer control signal TG4 may be transmitted to the first row lines Row0, and an eighth transfer control signal TG8 may be transmitted to the third row lines Row2.

Thereafter, during a fifth horizontal cycle, the first transfer control signal TG1 may be transmitted to the second row lines Row1, and the fifth transfer control signal TG5 may be transmitted to the fourth row lines Row3. During a sixth horizontal cycle, the second transfer control signal TG2 may be transmitted to the second row lines Row1, and the sixth transfer control signal TG6 may be transmitted to the fourth row lines Row3. During a seventh horizontal cycle, the third transfer control signal TG3 may be transmitted to the second row lines Row1, and the seventh transfer control signal TG7 may be transmitted to the fourth row lines Row3. During an eighth horizontal cycle, the fourth transfer control signal TG4 may be transmitted to the second row lines Row1, and the eighth transfer control signal TG8 may be transmitted to the fourth row lines Row3.

For example, in a full mode, pixels of the first and third row lines Row0 and Row2 that may be simultaneously driven may operate in response to first pixel control signals PCS1 having the same timing sequence. Therefore, the simultaneously driven row lines may share the control signal lines.

Referring to FIG. 18A, in a 4-sum mode, during the first horizontal cycle D1, the first to fourth transfer control signals TG1 to TG4 may be transmitted to the first row lines Row0, and the fifth to eighth transfer control signals TG5 to TG8 may be transmitted to the third row lines Row2. The image sensor may generate an image using pixel signals output from pixels of the first row lines Row0 and the third row lines Row2 during the first horizontal cycle D1.

Referring to FIG. 18B, in the 4-sum mode, during the second horizontal cycle D2, the second transfer control signal TG2 may be transmitted to the second row lines Row1 and the fifth to eighth transfer control signals TG5 to TG8 may be transmitted to the fourth row lines Row3. The image sensor may generate an image using pixel signals output from pixels of the second row lines Row1, and may implement an autofocus function using pixel signals output from pixels of the fourth row lines Row3.

In the example embodiment of FIG. 18A, the pixels of the first and third row lines Row0 and Row2 that may be simultaneously driven may operate in response to the first pixel control signals PCS1 having the same timing sequence. Therefore, the simultaneously driven row lines may share the control signal lines.

In the example embodiment of FIG. 18B, pixel signals may be read from all pixels of the second row lines Row1 to generate an image, but pixel signals may be read from a portion of the pixels of the fourth row lines Row3 to implement an autofocus function. Therefore, the second row lines Row1 and the fourth row lines Row3 need to be separately controlled. Therefore, the simultaneously driven row lines may not share the control signal lines.

Figure 19:
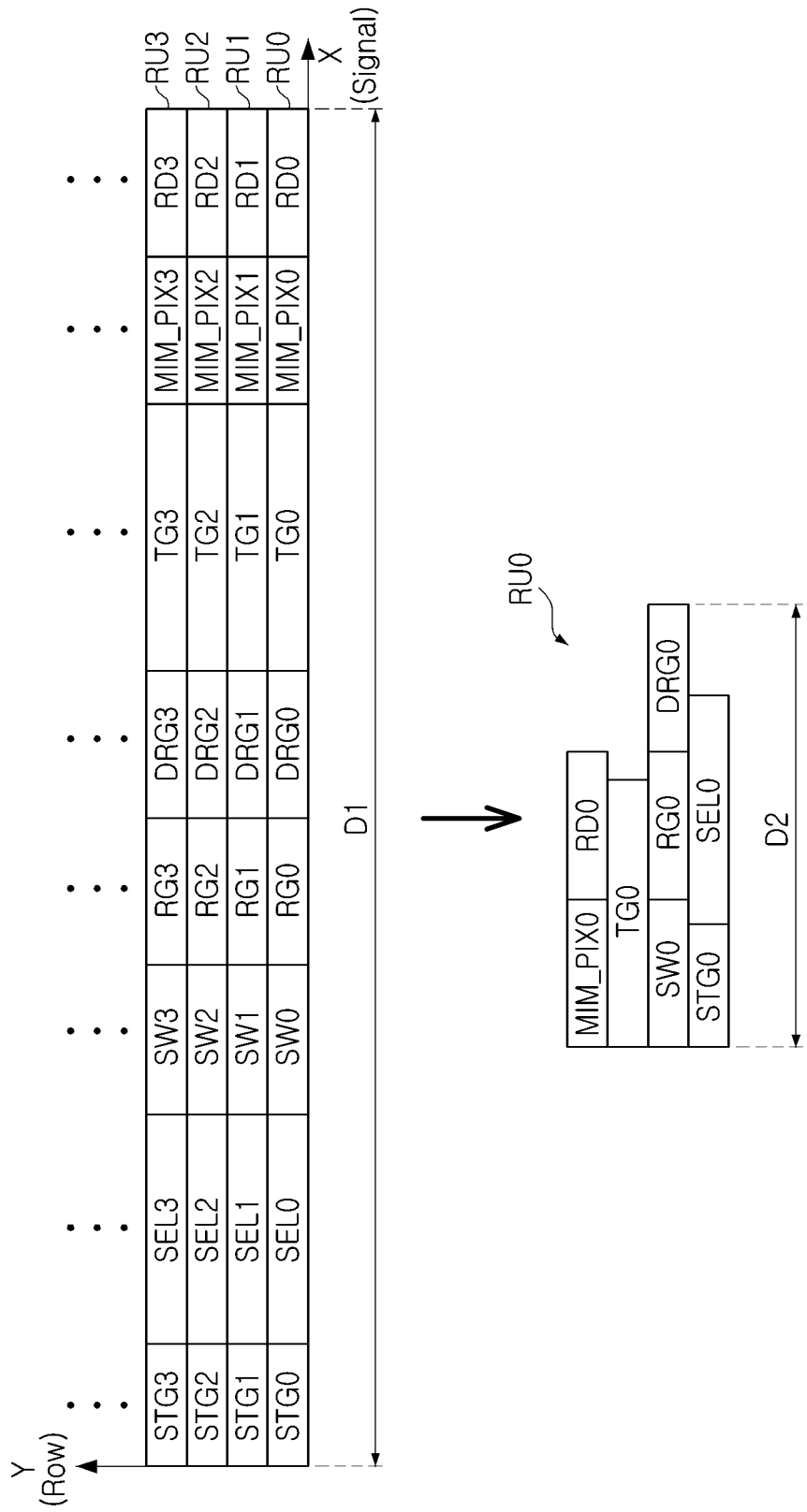
FIGS. 19 and 20 are conceptual diagrams illustrating a row driver according to an example embodiment of the inventive concept.
Figure 20:
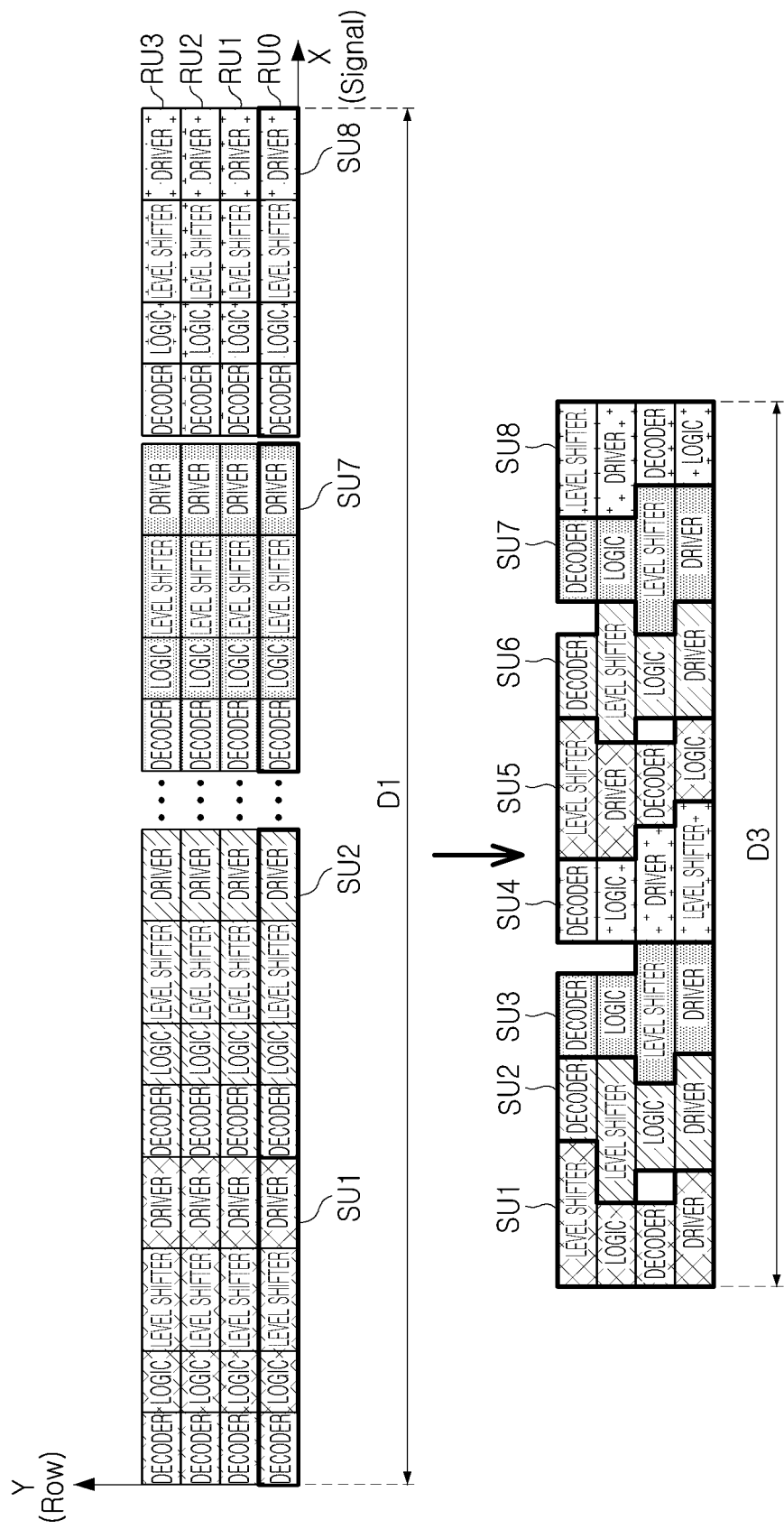

FIGS. 19 and 20 are conceptual diagrams illustrating a row driver according to an example embodiment of the inventive concept.

First, referring to FIG. 19, when four row driver circuits RU0 to RU3 are required to drive four rows, a row driver may have a first width D1 in a row line direction.

Each of the row driver circuits RU0 to RU3 may include sub-units SU1 to SU8 for a pixel control signal. For example, when pixel control signals include a first transfer control signal STG, a select signal SEL, a switch control signal SW, a first reset control signal RG, a second reset control signal DRG, a second transfer control signal TG, a first driving power MIM_PIX, and a second driving power RD, the sub-units SU1 to SU8 may correspond to each of the pixel control signals STG, SEL, SW, RG, DRG, TG., MIM_PIX, and RD. Each of the sub-units SU1 to SU8 may include a decoder, a logic, a level shifter, and a driver. In this specification, the sub-units SU1 to SU8 may be arranged in the row line direction, and the decoder, the logic, the level shifter, and the driver included in each of the sub-units SU1 to SU8 may also be arranged in the row line direction. The disclosure is not limited to the arrangement of the row driver, and as such, according to another example embodiment, the row driver may be provided with a different arrangement.

When a row driver circuit RU0 is provided to drive four rows, the row driver circuit RU0 may be separated for each of the sub-units SU1 to SU8 and may be provided in a column line direction. Therefore, the row driver may have a second width D2 in the row line direction, and the second width D2 may be narrower than the first width D1. Therefore, a size of the row driver may be reduced.

Referring to FIG. 20, when a row driver circuit RU0 is required to drive four rows, sub-unit SU1 to SU8 may be separated from the row driver circuit RU0 for a decoder, a logic, a level shifter, and a driver, to be arranged in the column line direction. Therefore, the row driver may have a third width D3 in the row line direction, and the third width D3 may be narrower than the first width D1. Therefore, a size of the row driver may be reduced.

Hereinafter, an effect of reducing a width of a row driver will be described with reference to FIGS. 21A and 21B.

Figure 21A:
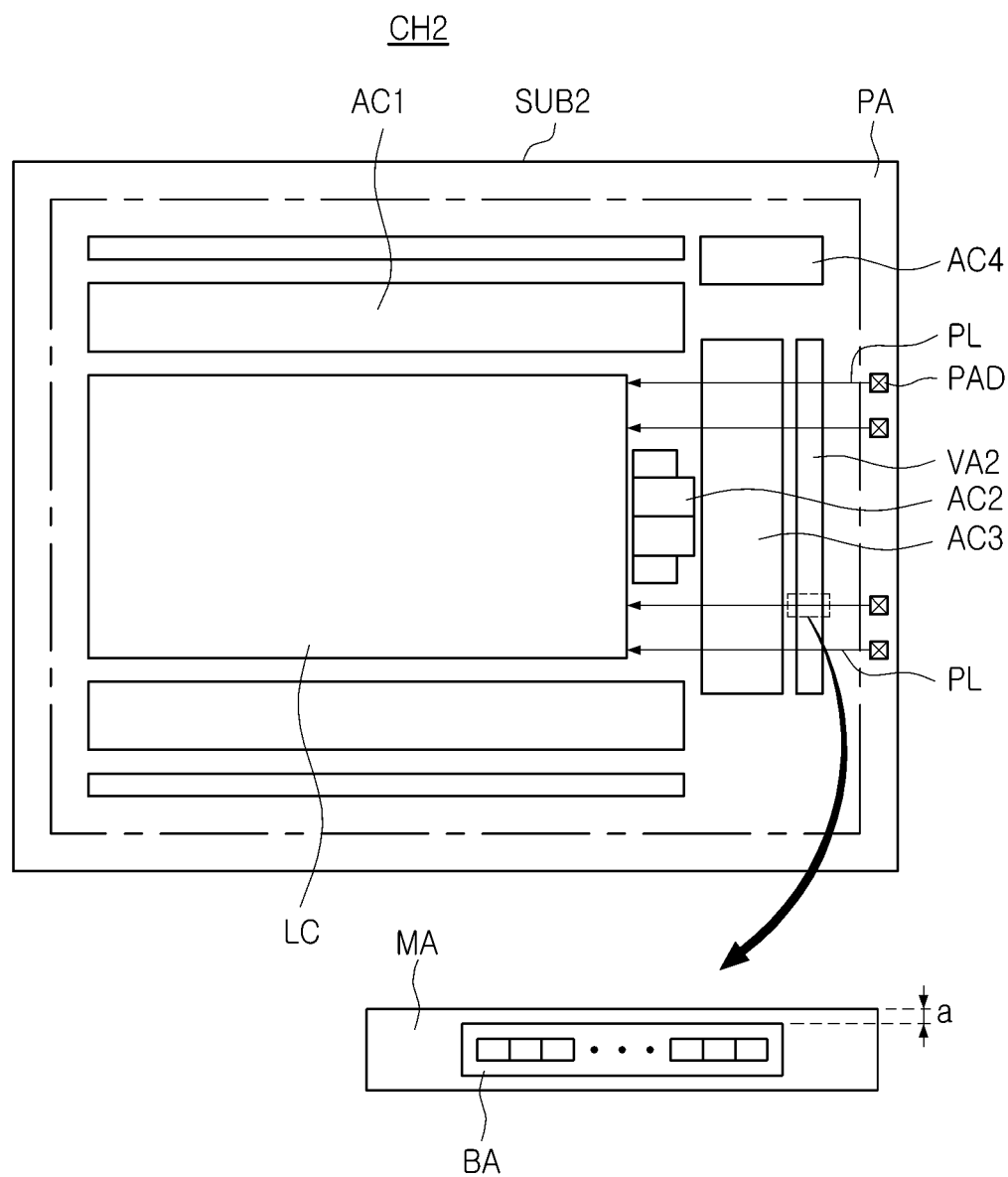
FIG. 21A is a comparative example of a plan view of an image sensor.
Figure 21B:
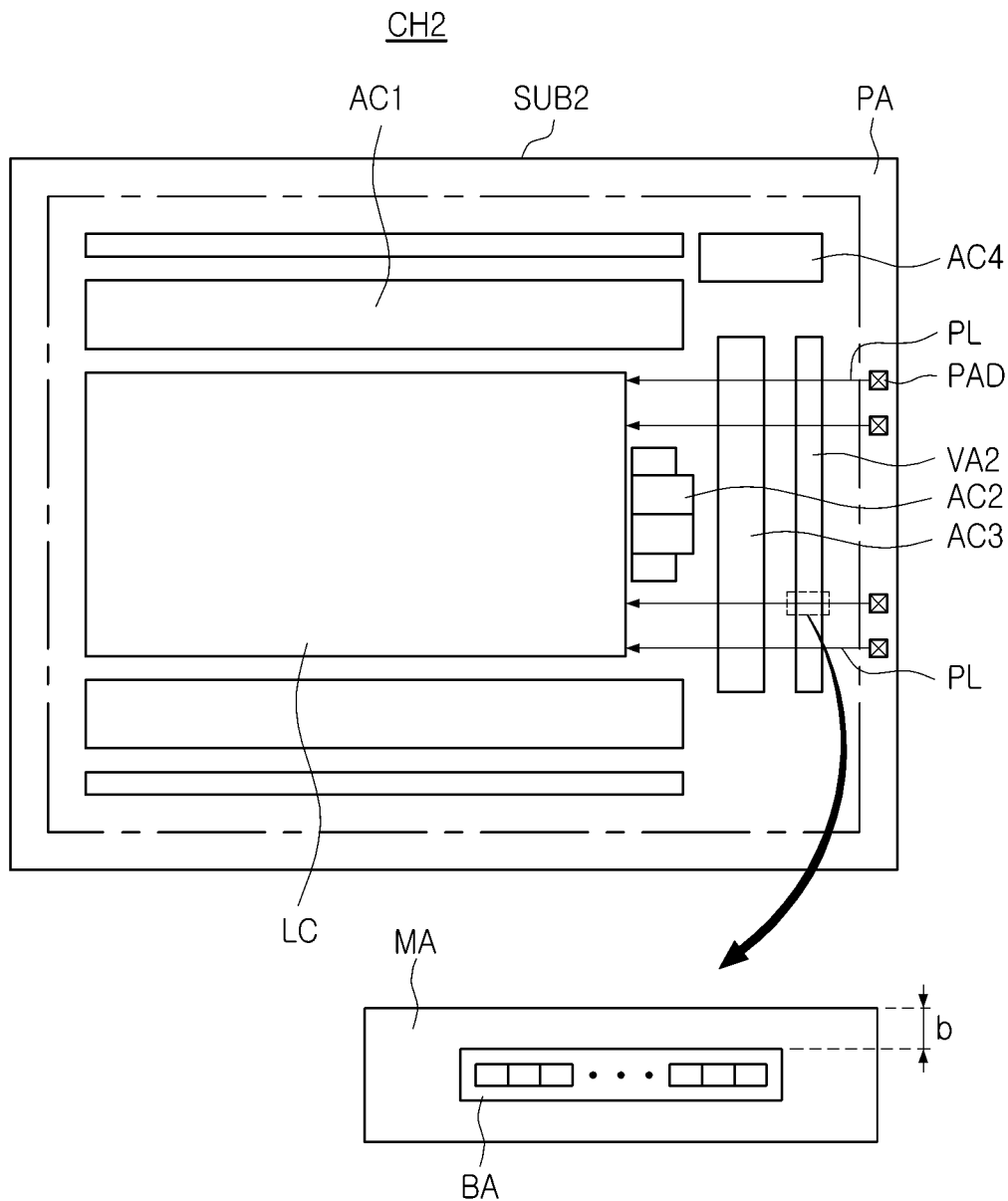
FIG. 21B is a plan view of an image sensor according to an example embodiment of the inventive concept.

FIG. 21A is a comparative example of a plan view of an image sensor, and FIG. 21B is a plan view of an image sensor according to an example embodiment of the inventive concept.

Referring to FIGS. 21A and 21B, a second via region VA2 may include via lines BA and a wiring region MA between the via lines BA thereon. The via lines BA may include vias formed between the second via region VA2 of a second layer CH2 and a first via region of a first layer on the second layer CH2. The vias may form control signal lines connected from a row driver AC3 to a pixel array. The wiring region MA may refer to a region in which a power line PL for supplying power from a logic power pad PAD to a logic circuit LC is formed.

Compared to the row driver of FIG. 21A, a row driver AC3 of FIG. 21B may have a reduced width in the row line direction. As a width of the row driver AC3 decreases, the number of vias included in via lines BA may also decrease. Therefore, a gap between the via lines BA may increase. When the gap between the via lines BA may be increased, the area of the power line PL to be formed in the wiring area MA may increase. For example, a width b of the power line PL of FIG. 21B may be wider than a width a of the power line PL of FIG. 21A. Therefore, sufficient power may be supplied to the logic circuit LC.

Figure 22:
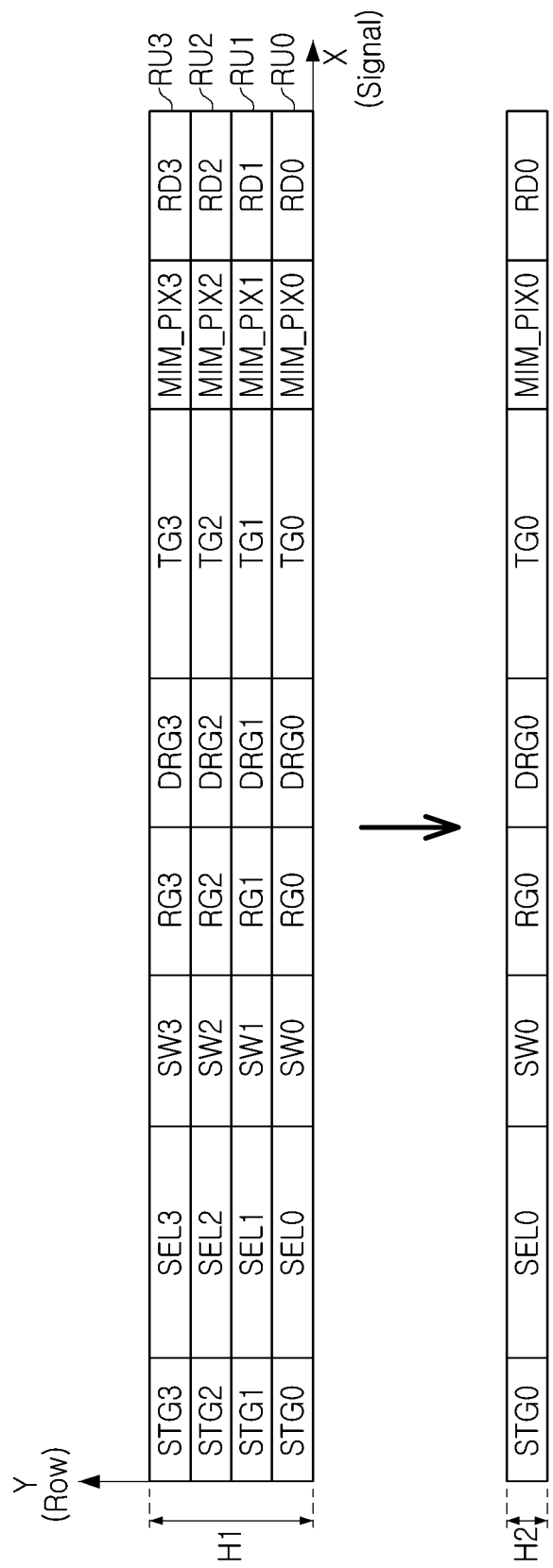
FIG. 22 is a conceptual diagram illustrating a row driver according to an example embodiment of the inventive concept.

FIG. 22 is a conceptual diagram illustrating a row driver according to an example embodiment of the inventive concept.

Referring to FIG. 22, when four row driver circuits RU0 to RU3 are required to drive four rows, a row driver may have a first length H1 in the column line direction. When a row driver circuit RU0 is required to drive four rows, the row driver circuit RU0 may have a second length H2 in the column line direction. The second length H2 may be smaller than the first length H1. Therefore, a size of the row driver may be reduced.

Hereinafter, an effect of reducing a length of a row driver will be described with reference to FIGS. 23 and 24.

Figure 23:
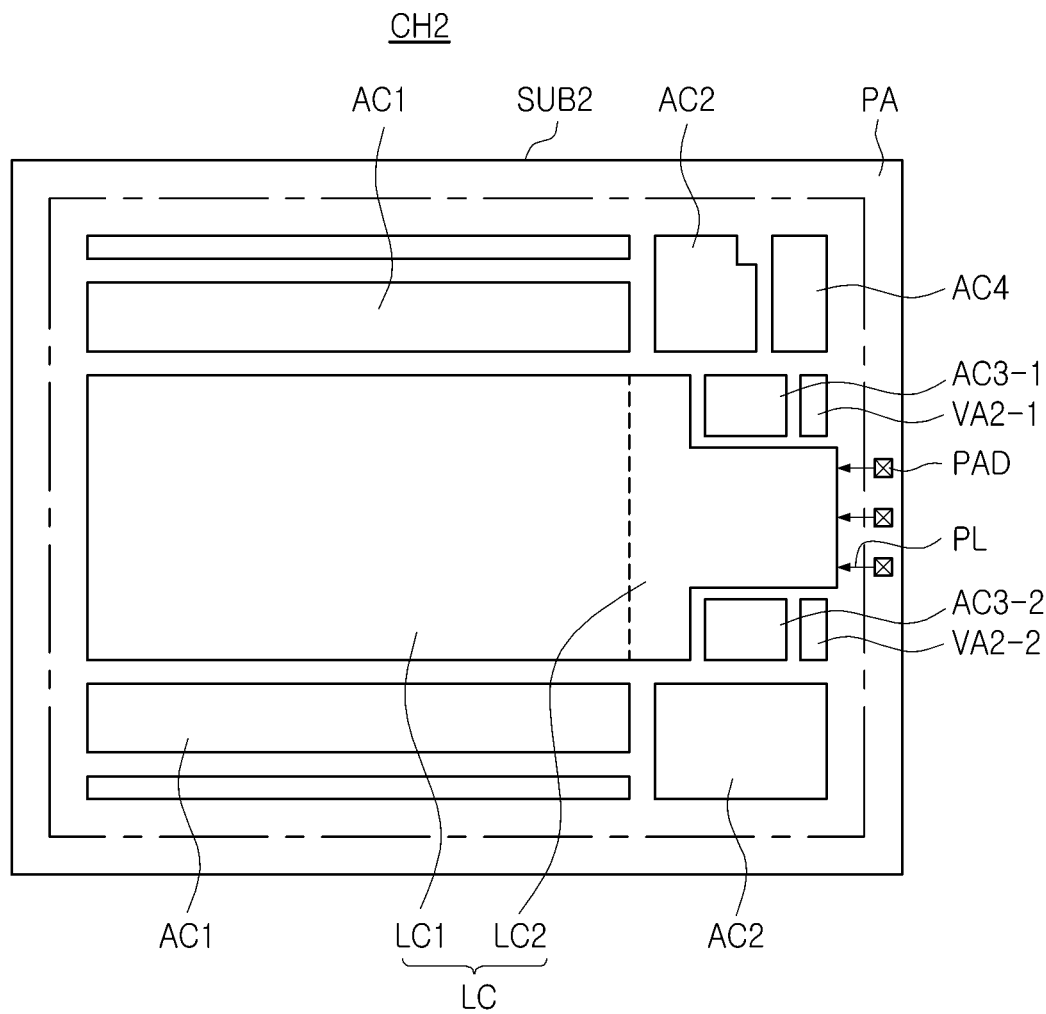
FIGS. 23 and 24 are plan views of an image sensor according to an example embodiment of the inventive concept.
Figure 24:
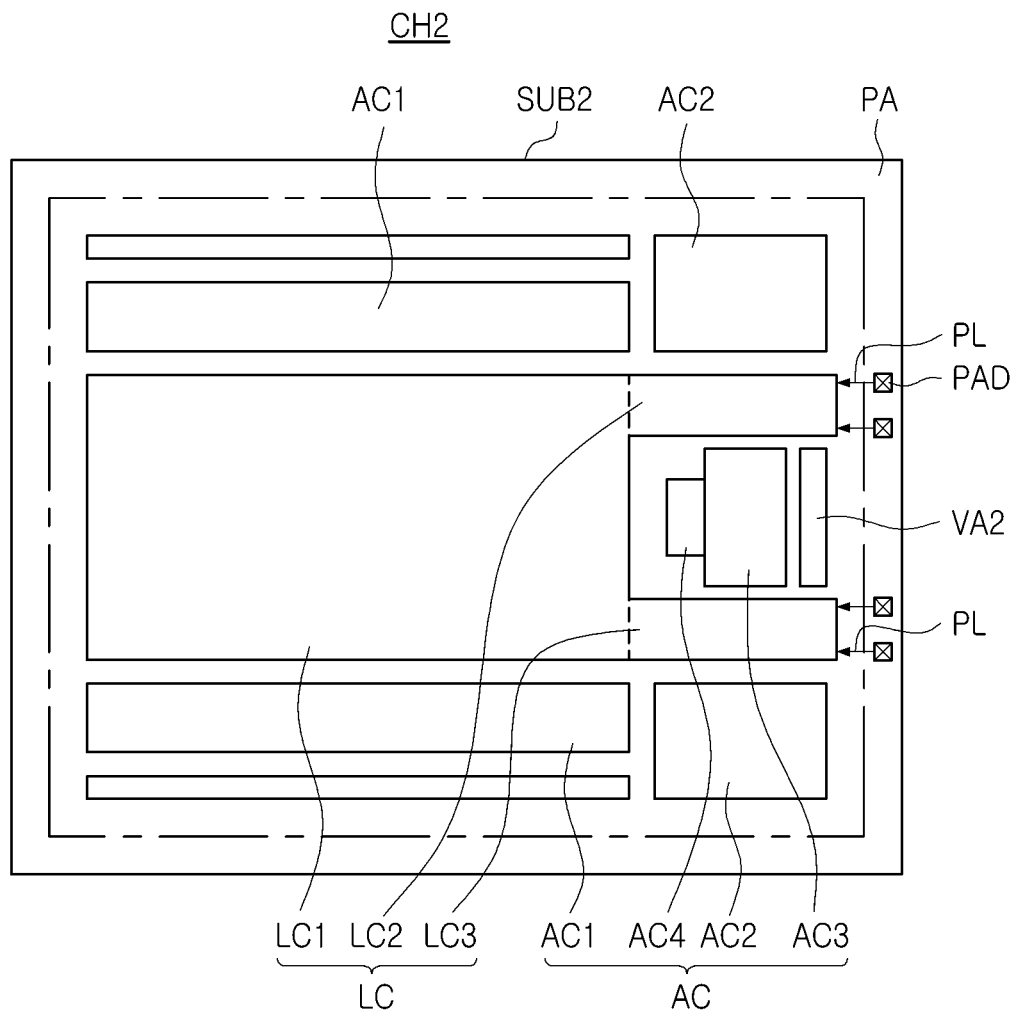

FIGS. 23 and 24 are plan views of an image sensor according to an example embodiment of the inventive concept.

Referring to FIG. 23, a length of a row driver AC3 may decrease in the column line direction. The length of the row driver AC3 may be reduced to divide the row driver AC3 into a first row driver AC3-1 and a second row driver AC3-2 in the column line direction. Similarly to the row driver AC3, a second via region VA2 may be also divided into a first via region VA2-1 corresponding to the first row driver AC3-1 and a second via region VA2-2 corresponding to the second row driver AC3-2.

A logic circuit LC may include a first region LC1 and a second region LC2. The first region LC1 may be disposed below a pixel array region included in a first layer. An area of the first region LC1 may be larger than an area of the second region LC2. The second region LC2 may be disposed adjacent to the first region LC1 in the row line direction. The second region LC2 may be disposed between the first row driver AC3-1 and the second row driver AC3-2 in the column line direction. The second region LC2 may receive power from a power pad PAD through a power line PL. Therefore, the power line PL supplying power to the logic circuit LC may be separated from the row drivers AC3-1 and AC3-2 in a direction, parallel to a plane of a second layer CH2. Therefore, the number of stacked layers that may be used as the power line PL may increase. Therefore, sufficient power may be supplied to the logic circuit LC. In addition, a space occupied by the row drivers AC3-1 and AC3-2 may be used as a region of the logic circuit LC.

In addition, a second analog circuit AC2 may be disposed adjacent to a first analog circuit AC1 in the row line direction to efficiently use the analog circuits.

Referring to FIG. 24, a length of a row driver AC3 may decrease in the column line direction. The length of the row driver AC3 may be reduced to secure a space for a logic circuit LC.

The logic circuit LC may include a first region LC1, a second region LC2, and a third region LC3. The first region LC1 may be disposed below a pixel array region included in a first layer. An area of the first region LC1 may be larger than an area of the second region LC2 and an area of the third region LC3. The second region LC2 and the third region LC3 may be disposed adjacent to the first region LC1 in the row line direction. The row driver AC3 may be disposed between the second region LC2 and the third region LC3 in the column line direction. At least one of the second region LC2 or the third region LC3 may receive power from a power pad PAD through a power line PL. Therefore, the power line PL supplying power to the logic circuit LC may be separated from the row driver AC3 in a direction, parallel to a plane of a second layer CH2.

According to an example embodiment of the inventive concept, as a length of the row driver decreases, the number of stacked layers that may be used as the power line PL, among a plurality of stacked layers, may increase. For example, sufficient power may be supplied to the logic circuit LC.

Similarly to those described with reference to FIG. 23, the number of stacked layers that may be used as the power line PL may increase. Therefore, sufficient power may be supplied to the logic circuit LC. In addition, a space occupied by the row driver AC3 may be used as a region of the logic circuit LC.

In addition, a second analog circuit AC2 may be disposed adjacent to a first analog circuit AC1 in the row line direction to efficiently use the analog circuits.

Figure 25:
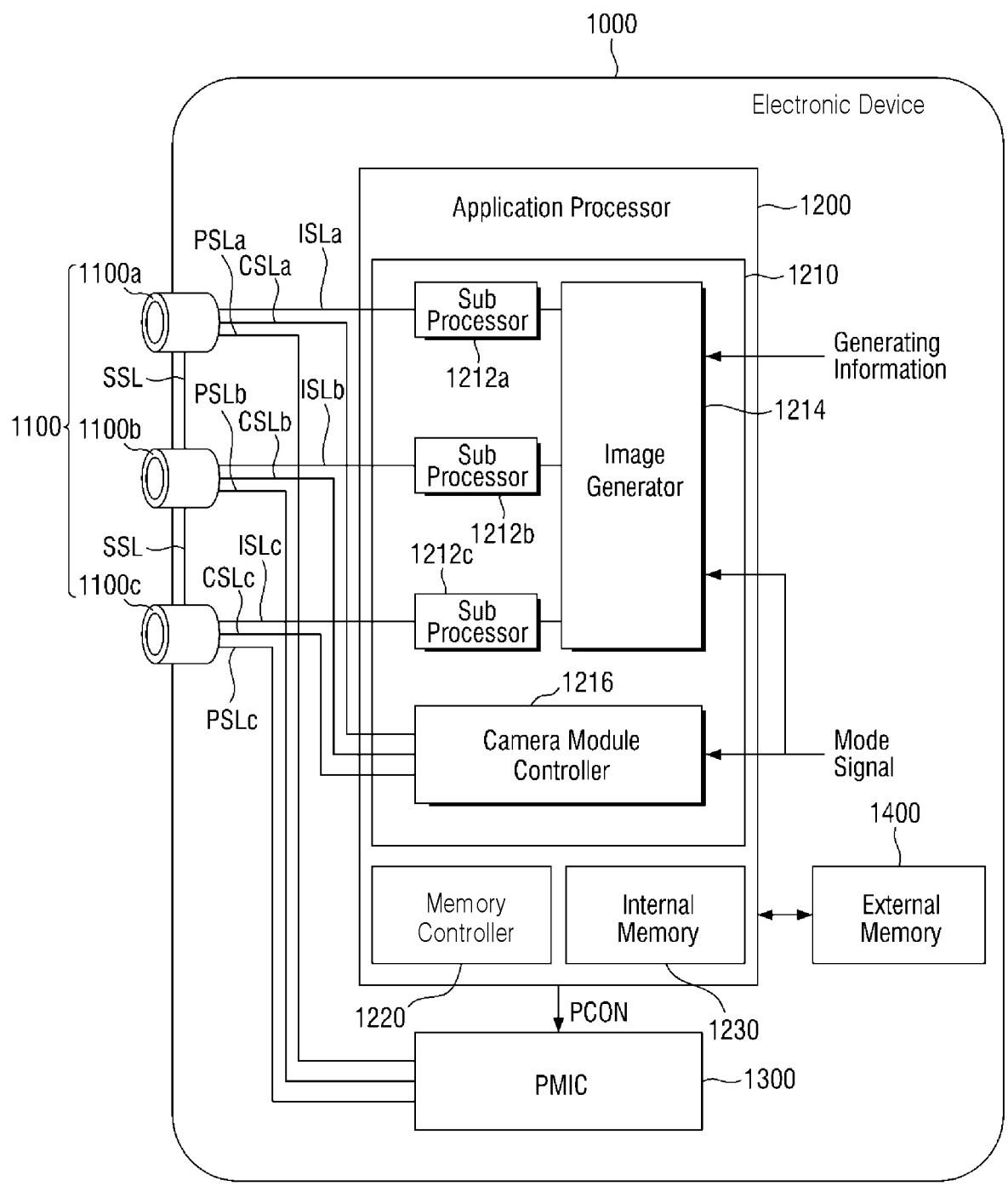
FIGS. 25 and 26 are views schematically illustrating an electronic device including an image sensor according to an example embodiment of the inventive concept.
Figure 26:
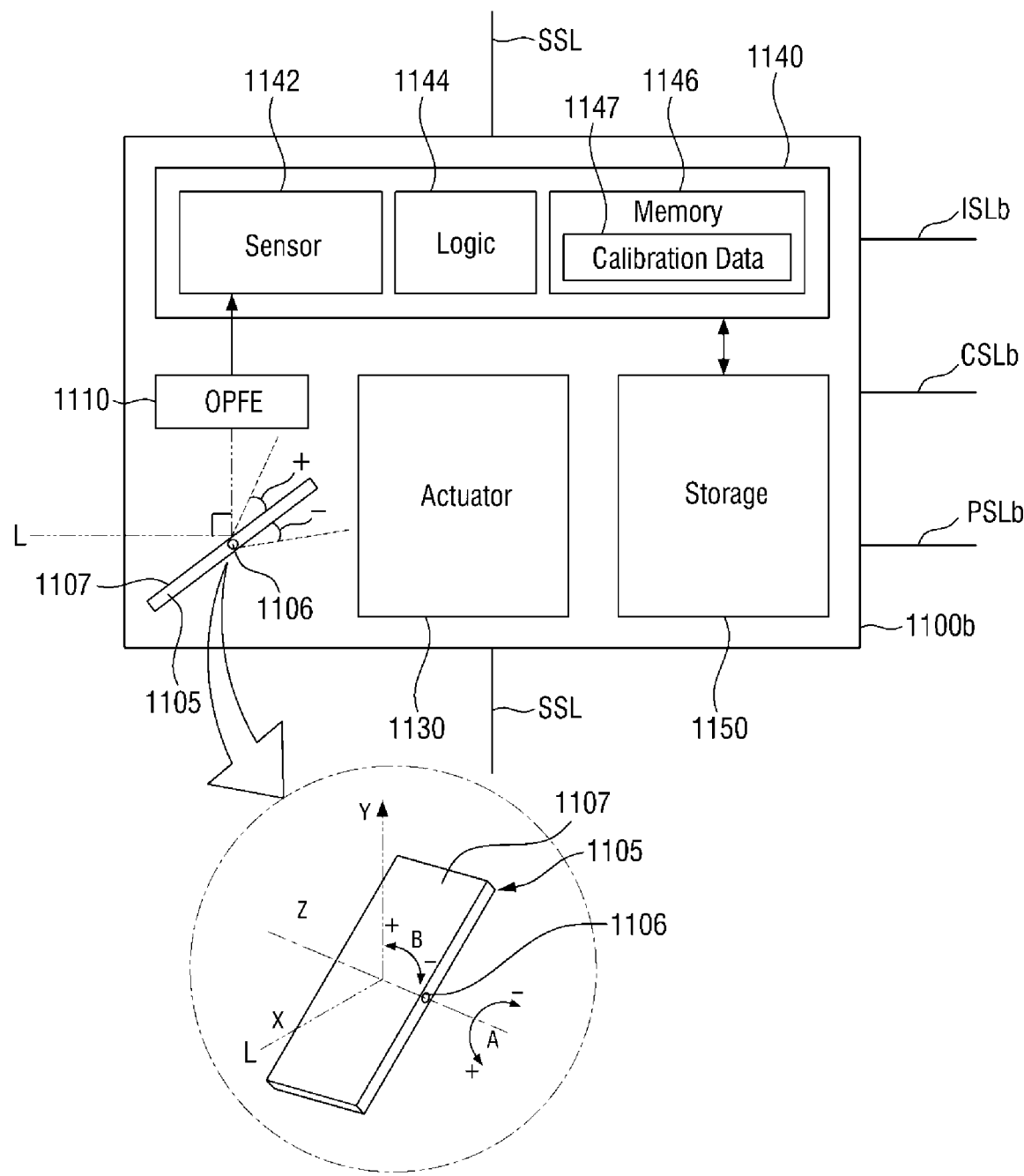

FIGS. 25 and 26 are views schematically illustrating an electronic device including an image sensor according to an example embodiment of the inventive concept.

Referring to FIG. 25, an electronic device 1000 may include a camera module group 1100, an application processor 1200, a PMIC 1300, and/or an external memory 1400.

The camera module group 1100 may include a plurality of camera modules 1100a, 1100b, and 1100c. Although FIG. 5 illustrates an example embodiment in which three camera modules 1100a, 1100b, and 1100c are arranged, the disclosure is not limited thereto. As such, according to another example embodiment, the camera module group 1100 may be modified to include only two (2) camera modules. In addition, in some example embodiments, the camera module group 1100 may be modified and implemented to include n (where n is a natural number of 4 or more) camera modules. In addition, in some example embodiments, at least one of the plurality of camera modules 1100a, 1100b, and 1100c included in the camera module group 1100 may be implemented by the image sensors according to an example embodiment among the example embodiments described in FIGS. 1 to 24.

Referring to FIG. 26, a configuration of the camera module 1100b will be described in more detail, but the following description may be equally applied to other camera modules 1100a and 1100c according to example embodiments.

According to an example embodiment illustrated in FIG. 26, the camera module 1100b may include a prism 1105, an optical path folding element (hereinafter referred to as "OPFE") 1110, an actuator 1130, an image sensing device 1140, and a storage device 1150.

The prism 1105 may include a reflective surface 1107 of a light reflecting material to change a path of light L externally incident.

According to an example embodiment, the prism 1105 may change the path of the light L, incident in a first direction X, to a second direction Y, perpendicular to the first direction X. In addition, the prism 1105 may rotate the reflective surface 1107 of the light reflecting material in a direction A around a central axis 1106, or may rotate the central axis 1106 in a direction B, to change the path of the light L, incident in the first direction X, to the second direction Y, perpendicular thereto. In some example embodiments, the OPFE 1110 may also move in a third direction Z, perpendicular to the first direction X and the second direction Y.

According to an example embodiment, a maximum rotation angle of the prism 1105 in the direction A may be 15 degrees or less in a positive (+) direction, and may be greater than 15 degrees in a negative (−) direction. However, the disclosure is not limited to the degrees illustrated in FIG. 26.

According to an example embodiment, the prism 1105 may move in a positive (+) direction or a negative (−) direction of the direction B by around 20 degrees, or between 10 degrees and 20 degrees, or between 15 degrees and 20 degrees. In some example embodiments, a moving angle may be an angle that may move at the same angle in the positive (+) or negative (−) direction of the direction B, or may move to almost the same angle in a range of around 1 degree.

In According to an example embodiment, the prism 1105 may move the reflective surface 1107 of the light reflecting material in a third direction (e.g., the direction Z), parallel to an extending direction of the central axis 1106.

The OPFE 1110 may include, for example, optical lenses of m (where m is a natural number) groups. The m optical lenses may move in the second direction Y to change an optical zoom ratio of the camera module 1100b. For example, if a basic optical zoom magnification of the camera module 1100b is Z, when the m optical lenses included in the OPFE 1110 move, an optical zoom magnification of the camera module 1100b may be changed to have an optical zoom magnification of 3 Z, 5 Z, or 5 Z or higher.

The actuator 1130 may move the OPFE 1110 or an optical lens (hereinafter, referred to as an optical lens) to a specific position. For example, the actuator 1130 may adjust a position of the optical lens to locate an image sensor 1142 at a focal length of the optical lens for accurate sensation.

The image sensing device 1140 may include an image sensor 1142, a control logic 1144, and a memory 1146. The image sensor 1142 may sense an image of an object to be sensed using light L provided through an optical lens. The control logic 1144 may control an overall operation of the camera module 1100b. For example, the control logic 1144 may control an operation of the camera module 1100b according to a control signal provided through a control signal line CSLb. According to an example embodiment, the control logic 1144 may include electronic components and/or circuitry.

The memory 1146 may store information necessary for an operation of the camera module 1100b, such as calibration data 1147. The calibration data 1147 may include information necessary for the camera module 1100b to generate image data using light L externally provided. The calibration data 1147 may include, for example, information on the degree of rotation, described above, information on a focal length, information on an optical axis, or the like. When the camera module 1100b is implemented in the form of a multi-state camera of which focal length is changed according to a position of the optical lens, the calibration data 1147 may include a focal length value for each position (or state) of the optical lens, and information related to auto focusing.

The storage device 1150 may store the image data sensed by the image sensor 1142. The storage device 1150 may be disposed external to the image sensing device 1140, and may be implemented in stacked form with a sensor chip constituting the image sensing device 1140. According to an example embodiment, the storage device 1150 may be implemented as an electrically erasable programmable read-only memory (EEPROM), but the disclosure are not limited thereto. As such, other types of storage devices may be used according to other example embodiments.

Referring to FIGS. 25 and 26 together, according to an example embodiment, the plurality of camera modules 1100a, 1100b, and 1100c may include the actuator 1130, respectively. Therefore, the plurality of camera modules 1100a, 1100b, and 1100c may include the same or different calibration data 1147, respectively, according to an operation of the actuator 1130 included therein.

According to an example embodiment, a camera module (e.g., 1100b), among the plurality of camera modules 1100a, 1100b, and 1100c, may be a folded lens type camera module including the prism 1105 and the OPFE 1110, described above, and remaining camera module(s) (e.g., 1100a or 1100c) may be a vertical type camera module not including the prism 1105 and the OPFE 1110, but the disclosure is not limited thereto.

In some example embodiments, a camera module (e.g., 1100c), among the plurality of camera modules 1100a, 1100b, and 1100c, may be a vertical type depth camera for extracting depth information using, for example, infrared ray (IR). In some example embodiments, the application processor 1200 may merge image data provided from the depth camera with image data provided from another camera module (for example, 1100a or 1100b) to generate a 3D depth image.

According to an example embodiment, at least two camera modules (e.g., 1100a and 1100b), among the plurality of camera modules 1100a, 1100b, and 1100c, may have different fields of view (e.g., field of view angles). According to an example embodiment, for example, optical lenses of the at least two camera modules (e.g., 1100a and 1100b), among the plurality of camera modules 1100a, 1100b, and 1100c, may be different from each other, but the disclosure is not limited thereto.

According to an example embodiment, field of view angles of each of the plurality of camera modules 1100a, 1100b, and 1100c may be different. According to an example embodiment, optical lenses included in each of the plurality of camera modules 1100a, 1100b, and 1100c may also be different from each other, but the disclosure is not limited thereto.

According to an example embodiment, each of the plurality of camera modules 1100a, 1100b, and 1100c may be arranged to be physically separated from each other. For example, a sensation area of the one image sensor 1142 may not be divided and used by the plurality of camera modules 1100a, 1100b, and 1100c, but an independent image sensor 1142 inside each of the plurality of camera modules 1100a, 1100b, and 1100c may be provided.

Referring back to FIG. 25, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented to be separated from each other, as separate semiconductor chips.

The image processing device 1210 may include a plurality of sub-image signal processors 1212a, 1212b, and 1212c, an image generator 1214, and a camera module controller 1216.

The image processing device 1210 may include a plurality of sub-image signal processors 1212a, 1212b and 1212c, corresponding to the number of camera modules 1100a, 1100b, and 1100c.

Image data generated from each of the camera modules 1100a, 1100b, and 1100c may be provided to the corresponding sub-image signal processors 1212a, 1212b, and 1212c through image signal lines ISLa, ISLb, and ISLc, separated from each other. For example, image data generated from the camera module 1100a may be provided to the sub-image signal processor 1212a through the image signal line ISLa, image data generated from the camera module 1100b may be provided to the sub-image signal processor 1212b through the image signal line ISLb, and image data generated from the camera module 1100c may be provided to the sub-image signal processor 1212c through the image signal line ISLc. Transmission of such image data may be performed using, for example, a camera serial interface (CSI) based on a mobile industry processor interface (MIPI), but the disclosure is not limited thereto.

According to an example embodiment, a sub-image signal processor may be disposed to correspond to a plurality of camera modules. For example, the sub-image signal processor 1212a and the sub-image signal processor 1212c may not be implemented to be separated from each other, as illustrated, but may be implemented to be integrated into a single sub-image signal processor, and image data provided from the camera module 1100a and the camera module 1100c may be selected by a select element (e.g., a multiplexer) or the like, and may be then provided to the integrated sub-image signal processor.

Image data provided to each of the sub-image signal processors 1212a, 1212b, and 1212c may be provided to the image generator 1214. The image generator 1214 may use the image data provided from each of the sub-image signal processors 1212a, 1212b, and 1212c, according to image generation information or a mode signal, to generate an output image.

In particular, the image generator 1214 may merge at least portion of the image data generated from the camera modules 1100a, 1100b, and 1100c having different field of view angles, according to image generation information or a mode signal, to generate an output image. In addition, the image generator 1214 may generate an output image by selecting one of image data generated from camera modules 1100a, 1100b, and 1100c having different viewing angles according to image generation information or a mode signal.

According to an example embodiment, the image generation information may include a zoom signal or a zoom factor. According to an example embodiment, the mode signal may be, for example, a signal based on a mode selected by a user.

When the image generation information is a zoom signal (e.g., a zoom factor) and each of the camera modules 1100a, 1100b, and 1100c has a different field of view field (e.g., a different field of view angle), the image generator 1214 may operate differently according to a type of the zoom signal. For example, when the zoom signal is a first signal, after merging image data output from the camera module 1100a and image data output from the camera module 1100c, the merged image signal and image data output from the camera module 1100b, not used in the merging, may be used to generate an output image. When the zoom signal is a second signal, different from the first signal, the image generator 1214 may not perform such image data merging, and may select one of the image data output from each of the camera module 1100a, 1100b, and 1100c, to create an output image. Example embodiments are not limited thereto, and a method of processing image data may be modified and performed as needed.

According to an example embodiment, the image generator 1214 may receive a plurality of pieces of image data having different exposure points in time from at least one sub-image signal processor, among the plurality of sub-image signal processors 1212a, 1212b, and 1212c, and may process high dynamic range (HDR) with respect to the plurality of pieces of image data, to generate merged image data having an increased dynamic range.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through control signal lines CSLa, CSLb, and CSLc, separated from each other.

One of the plurality of camera modules 1100a, 1100b, and 1100c may be designated as a master camera (for example, 1100b), according to image generation information including a zoom signal, or a mode signal, and remaining camera modules (for example, 1100a and 1100c) may be designated as slave cameras. Such information may be included in the control signal, and may be provided to the corresponding camera modules 1100a, 1100b, and 1100c through the control signal lines CSLa, CSLb, and CSLc, separated from each other.

Camera modules operating as masters and slaves may be changed according to a zoom factor or an operation mode signal. For example, when a field of view angle of the camera module 1100a is wider than a field of view angle of the camera module 1100b and the zoom factor indicates a low zoom magnification, the camera module 1100b may operate as a master, and the camera module 1100a may operate as a slave. When the zoom factor indicates a high zoom magnification, the camera module 1100a may operate as a master and the camera module 1100b may operate as a slave.

According to an example embodiment, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving such a sync enable signal may generate a sync signal based on the sync enable signal, and may transmit the generated sync signal to the camera modules 1100a and 1100c through a sync signal line SSL. The camera module 1100b and the camera modules 1100a and 1100c may be synchronized with the sync signal, to transmit image data to the application processor 1200.

According to an example embodiment, a control signal provided from the camera module controller 1216 to the plurality of camera modules 1100a, 1100b, and 1100c may include mode information according to a mode signal. Based on this mode information, the plurality of camera modules 1100a, 1100b, and 1100c may operate in a first operation mode and a second operation mode in relation to a sensation rate.

In the first operation mode, the plurality of camera modules 1100a, 1100b, and 1100c may generate an image signal at a first rate (for example, generate an image signal of a first frame rate), may encode the generated image signal at a second rate, higher than the first rate (e.g., encode an image signal having a second frame rate, higher than the first frame rate), and may transmit the encoded image signal to the application processor 1200. In some example embodiments, the second rate may be 30 times or less of the first rate.

The application processor 1200 may store the transmitted image signal, e.g., the encoded image signal, in the internal memory 1230, or in a storage 1400 external to the application processor 1200, and may then read the encoded image signal from the internal memory 1230 or the storage 1400, may decode the read image signal, and may display image data generated based on the decoded image signal. For example, a corresponding sub-image signal processor, among the plurality of sub-image signal processors 1212a, 1212b, and 1212c of the image processing device 1210, may decode the read image signal, and may also perform image processing on the decoded image signal.

In the second operation mode, the plurality of camera modules 1100a, 1100b, and 1100c may generate an image signal at a third rate, lower than the first rate (e.g., generate an image signal of a third frame rate, lower than the first frame rate), and may transmit the image signal to the application processor 1200. The image signal provided to the application processor 1200 may be a signal, not encoded. The application processor 1200 may perform image processing on the received image signal, or may store the received image signal in the internal memory 1230 or the storage 1400.

The PMIC 1300 may supply power, for example, a power supply voltage to each of the plurality of camera modules 1100a, 1100b, and 1100c. For example, the PMIC 1300 may supply first power to the camera module 1100a through a power signal line PSLa under control of the application processor 1200, may supply second power to the camera module 1100b through a power signal line PSLb, and may supply third power to the camera module 1100c through a power signal line PSLc.

The PMIC 1300 may generate power, corresponding to each of the plurality of camera modules 1100a, 1100b, and 1100c, in response to a power control signal PCON from the application processor 1200, and may also adjust a level of the power. The power control signal PCON may include a power adjustment signal for each operation mode of the plurality of camera modules 1100a, 1100b, and 1100c. For example, the operation mode may include a low power mode. In some example embodiments, the power control signal PCON may include information on a camera module operating in the low power mode and a level of the power to be set. The levels of power provided to each of the plurality of camera modules 1100a, 1100b, and 1100c may be the same or different from each other. Also, the level of power may be dynamically changed.

In an image sensor according to an example embodiment of the inventive concept, since a row driver circuit may control a plurality of rows, the number of row driver circuits included in a row driver may be reduced.

Therefore, a size of the row driver may be reduced. When the size of the row driver is reduced, a width of a power line supplying power from a logic power pad to a logic circuit may increase. Also, the number of stacked layers that may be used as the power line may increase. Therefore, there may be an effect that sufficient power is supplied to the logic circuit.

Also, the number of control signal lines connected from the row driver to a pixel array may be reduced. Therefore, routing of the control signal lines input to the pixel array may be easy.

Various advantages and effects of the inventive concept are not limited to the above-described contents, and may be more easily understood in the process of describing specific embodiments of the inventive concept.

While example embodiments have been illustrated and described above, it will be apparent to those skilled in the art that modifications and variations could be made without departing from the scope of the inventive concept as defined by the appended claims.

What is claimed is:

1. An image sensor comprising:
   a first layer including a pixel array region having a plurality of pixels arranged in a plurality of row lines and a plurality of column lines; and
   a second layer including a row driver, the row driver configured to select at least a portion of the plurality of row lines as selected row lines, generate pixel control signals driving the selected row lines, and output the pixel control signals to control signal lines,
   wherein the selected row lines share the control signal lines,
   the selected row lines commonly receive the pixel control signals at a branch point of the first layer from the control signal lines, and
   the pixel control signals simultaneously drive the selected row lines,
   wherein a first control signal line, among the control signal lines, branches at the branch point and connects to two or more of the selected row lines.

2. The image sensor of claim 1, wherein the branch point is provided adjacent to a boundary of the pixel array region included in the first layer.

3. The image sensor of claim 2, wherein the first layer comprises a first via region, and
the second layer comprises a second via region,
wherein the control signal lines are connected from the row driver to the branch point through the first via region and the second via region, and
the second via region does not overlap the pixel array region in a direction, perpendicular to an upper surface of the first layer.

4. The image sensor of claim 1, wherein a number of the control signal lines shared by the selected row lines is less than a number of the selected row lines, and is equal to a number of row lines included in a row.

5. The image sensor of claim 1, wherein the selected row lines are simultaneously driven based on the pixel control signals, and pixel signals output from pixels of the selected row lines are simultaneously read.

6. The image sensor of claim 1, wherein the row driver comprises a plurality of row driver circuits generating the pixel control signals, and
the pixel control signals for driving the selected row lines are generated by a same row driver circuit.

7. An image sensor comprising:
a first layer including a pixel array region having a plurality of pixels arranged in a plurality of row lines and a plurality of column lines; and
a second layer including a row driver, the row driver configured to select at least a portion of the plurality of row lines as selected row lines, generate pixel control signals driving the selected row lines, and supply the pixel control signals to the selected row lines through control signal lines,
wherein the row driver comprises a plurality of row driver circuits,
first row lines, among the plurality of row lines, selected during a first horizontal cycle receive first pixel control signals from a common row driver circuit,
each of second row lines, among the plurality of row lines, selected during a second horizontal cycle, after the first horizontal cycle, receive second pixel control signals from individual row driver circuits.

8. The image sensor of claim 7, wherein the first row lines share the control signal lines,
the first row lines commonly receive the first pixel control signals at a branch point of the first layer from the control signal lines in common.

9. The image sensor of claim 8, wherein the branch point is provided adjacent to a boundary of the pixel array region in the first layer.

10. The image sensor of claim 9, wherein a number of the control signal lines shared by the first row lines is less than a number of the first row lines, and is equal to a number of first row lines included in a row.

11. The image sensor of claim 7, wherein the image sensor is configured to:
generate an image using first pixel signals output from pixels of the first row lines during the first horizontal cycle, and
perform an autofocus function using second pixel signals output from pixels of the second row lines during the second horizontal cycle.

12. The image sensor of claim 7, wherein during the first horizontal cycle, the first row lines are simultaneously driven based on the first pixel control signals, and first pixel signals output from pixels of the first row lines are simultaneously read.

13. The image sensor of claim 12, wherein during the second horizontal cycle, the second row lines are simultaneously driven based on the second pixel control signals, and second pixel signals output from pixels of the second row lines are simultaneously read.

14. The image sensor of claim 1, wherein a first pixel control signal of the first control signal line is configured to simultaneously drive the two or more of the selected row lines.

* * * * *